United States Statutory Invention Registration [19]

[11] Reg. Number: H521

Fan [43] Published: Sep. 6, 1988

[54] THERMOSETTING POLYSULFONES

[76] Inventor: You-Ling Fan, 3 Heritage Ct., East Brunswick, N.J. 08816

[21] Appl. No.: 4,721

[22] Filed: Jan. 20, 1987

Related U.S. Application Data

[63] Continuation of Ser. No. 775,713, Sep. 16, 1985, abandoned, which is a continuation of Ser. No. 659,509, Oct. 11, 1984, abandoned, which is a continuation of Ser. No. 563,267, Dec. 20, 1983, abandoned, which is a continuation of Ser. No. 393,768, Jun. 20, 1982, abandoned.

[51] Int. Cl.[4] ..... C08F 283/08; C08L 71/04; C08L 71/02; C08L 63/00

[52] U.S. Cl. ..... 525/391; 525/396; 525/397; 525/390; 525/389; 525/535

*Primary Examiner*—John F. Terapane
*Assistant Examiner*—J. E. Thomas

[57] ABSTRACT

Class of high performance thermosetting materials composed of polyarylene polyether resins having each of their ends capped with a monovalent unsaturated organo radical. The end-capped polyarylene polyether resins have the formula:

Z-(-polyarylene polyether chain-)-Z' wherein Z and Z' are each a monovalent unsaturated organo radical. Usually Z and Z' are alkylene, aralkylene or cycloalkylene moieties. The end-capped polyarylene polyethers can be cured as is or in the presence of one or more unsaturated comonomers to afford homopolymers or copolymers, respectively. Such cured systems exhibit high glass transition temperatures, good tensile properties, excellent electric and alkali resistance and improved stress cracking resistance. End-terminated polysulfone resins having molecular weight of 5,000 to 15,000 are especially advantageous. The properties exhibited by the vinyl/allyl terminated oligomers are useful in fields which require high temperature performance, excellent solvent resistance and good fabrication characteristics. Specific areas of application include high performance molded products for appliances and electronics, high temperature laminates and adhesives and protective and insulative coatings.

10 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CORRELATION BETWEEN [SULFONE] / [BISPHENOL A] CHARGE RATIO AND REDUCED VISCOSITY OF VINYL BENZYLOXY END-CAPPED PSF-VR

GLASS TRANSITION TEMPERATURE VS. REDUCED VISCOSITY OF VINYL BENZYLOXY END-CAPPED PSF-VR ( ○ VIRGIN SAMPLE
● RERUN AFTER HEATED TO 217°C)

THERMOSETTING POLYSULFONES

This is a continuation of application Ser. No. 775,713, filed Sept. 16, 1985, abandoned, which is a continuation of Ser. No. 659,509, filed Oct. 11, 1984, abandoned, which is a continuation of Ser No. 563,267, filed Dec. 20, 1983, which is a continuation of Ser. No. 393,768, filed June 20, 1982, abandoned.

BACKGROUND OF THIS INVENTION

1. Field Of This Invention

The invention relates to thermosetting end-capped polyarylene polyethers, including end-capped polyarylene polyethers, processes of preparing and using such resins, composites containing such resins, and homopoLymers and copolymers prepared from such resins.

2. Prior Art

Thermoplastic polyarylene polyethers are known. Thermoplastic silane end-capped polyarylene polyethers and thermoplastic polysiloxane-polyarylene polyether copolymers are also known.

BROAD DESCRIPTION OF THE INVENTION

An object of the invention is to provide a new and useful class of high performance end-capped polyarylene polyethers, particularly end-capped polysulfones. Another object of the invention is to provide compositions containing and copolymers produced from such polyarylene polyethers and comonomers. Another object of this invention is to provide homopolymers prepared from such polyarylene polyethers. A further object of the invention is to provide processes for preparing and using such polyarylene polyethers, compositions, homopolymers and copolymers. A still further object of the invention is to provide a composite of a substrate and such polyarylene polyethers, homopolymers and copolymers. Other objects and advantages of the invention are set out herein or are obvious herefrom to one ordinarily skilled in the art.

The objects and advantages of the invention are achieved by the thermosetting polyarylene polyethers and so forth of the invention.

The thermosetting, monovalent unsaturated organo end-capped polyarylene polyethers of the invention differ from the known thermoplastic polyarylene polyethers and the known silane end-capped polyarylene polyethers most significantly in that the compositions of the invention have reactive, monovalent, unsaturated organo end-capping groups.

In its broadest sense, the invention involves end-capped polyarylene polyethers having the formula:

$$Z\text{-}(\text{polyarylene polyether chain})\text{-}Z'$$

wherein Z and Z' are each a monovalent unsaturated organo moiety. The polyarylene polyether chain can be substituted or unsubstituted. The end-capped resins of the invention are a class of organic resins having etheric oxygen valently connecting together aromatic nuclei or residue of aromatic compounds. These end-capped resins are appropriately termed end-capped polyarylene polyethers resins.

A preferred class of compositions that are within the scope of the invention are the thermosetting end-capped polyarylene polyether resins having the formula:

$$Z\text{-}(O\text{—}E'\text{—}O\text{—}E)_n\ OZ'$$

wherein n is a positive number, Z and Z' are each a monovalent unsaturated organo moiety, E is the residue after removal of the hydroxyl groups of a dihydric phenol, and E' is the residue after removal of the two activated halo groups of an aromatic compound having two activated halo substituents. The residues represented by E and E' can be unsubstituted or substituted beyond the already defined degree. These thermosetting resins can be produced by reacting an alkali metal phenoxide end-capped polyarylene polyether with a monovalent, monohalo-substituted, unsaturated organo compound. Preferably n is 2 to 300; and preferably Z and Z' are each an alkylene, aralkylene or cycloalkylene moiety.

Another preferred class of compositions that are within the scope of the invention are the thermosetting end-capped polyarylene polyether ogliomers or resins having the formula:

$$Z\text{-}(O\text{—}Ar)_n\ OZ'$$

wherein n is a positive number, Z and Z' are each a monovalent unsaturated organo moiety, and Ar is a divalent aromatic group that can be the same or different from one -(O—Ar)- group to the next, and in which each Ar group is bonded to the connecting oxy groups through aromatic carbon atoms. The aromatic group represented by Ar can be substituted or unsubstituted. These thermosetting resins can be produced by reacting an alkali metal phenoxide end-capped polyarylene polyether with a monovalent, monohalo-substituted, unsaturated organo compound. Preferably n is 2 to 300; and preferably Z and Z' are each an alkylene, aralkylene or cycloalkylene moiety.

The polyarylene polyether chain, particularly the benzenoid constituents, can contain inert substituents such as halogens (e.g., chlorine, bromide and fluorine) alkyl groups having from 1 to 4 carbon atoms and alkoxy groups having 1 to 4 carbon atoms.

The end-capped polyarylene polyether resins of the invention have excellent strength and toughness properties as well as outstanding thermal oxidative and chemical stability. They find wide utility in the production of shaped and molded articles where such properties are necessary and are highly desirable and also in the preparation of film and fiber products which have excellent mechanical properties Heat-hardenable resins can be blended with thermosetting, end-capped polyarylene polyether resins of this invention to yield useful mixtures.

The preferred class of end-capped thermosetting resins of the invention are those polysulfones where the thermosetting polyarylene polyether resin is composed of recurring units having the formula:

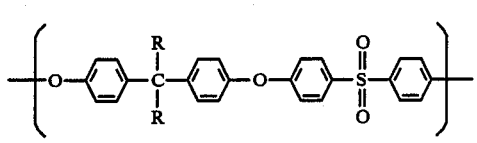

I wherein R is hydrogen, lower alkyl, lower aryl and halogen substituted lower alkyl and lower aryl groups. Most preferably R is methyl. The lower alkyl groups have from 1 to 4 carbon atoms.

As often used herein, the polysulfone-vinyl reactive resins or PSF-VR are the above end-capped resins when R is methyl and the end-capping moieties are alkylene, aralkylene or cycloalkylene moieties. Other times herein the phrase polysulfone-vinyl reactive resins (PSF-VR) is used as a shorthand reference broadly for the end-capped polyarylene polyether resins.

The ability of polysulfone-vinyl reactive resins to be cured by conventional techniques and their ability to copolymerize with a variety of commercially available, inexpensive comonomers, make them an important class of new thermoset resins. Of particular importance is the polysulfone-vinyl reactive styrene binder system which not only forms a true solution in any proportion but also yields a copolymer of uniform, well-defined properties. It can be formulated, processed and cured like an unsaturated polyester resin to impart higher use temperatures, better mechanical and electrical properties, and, above all, improved chemical resistance to strong alkaline environment.

The polysulfone-vinyl reactive resins of the invention are particularly useful as (1) corrosion resistance matrix resins or additives, (2) powder coatings, (3) magnet wire coatings, (4) photocurable and radiation coatings and (5) in fiber reinforced structural composites.

The thermoset vinyl benzyloxy end-capped polysulfones in coating form on metal sheets and the like are highly resistant to the solvent action to acetone and chlorinated hydrocarbons, such as, methylene chloride. Such coatings are also highly resistant to hot alkali solutions.

A thermoset or baked coating of the allyl end-capped polysulfones on a metal or glass substrate is readily removable or strippable once subjected to hot detergent solutions. This property means strippable coating applications to protect glass substrates, particularly to hot alkali solutions for the thermoset allyl-terminated polysulfone coatings of the invention. Similarly, metal protective coatings, such as, metal strip and prime coatings, can coatings, wire magnet coatings and pipe liner coatings are also applications for the thermoset allyl-terminated polysulfones of the invention.

The thermoset vinylbenzyloxy end-capped polysulfone (10,000 molecular weight) had significant resistance to the solvent action of trichloroethylene, which is important in some electrical applications.

The end-capped polyarylene polyethers of the invention have the same advantages and uses as the subgroup end-capped polysulfones of the invention.

The invention includes the homopolymers of the end-capped polyarylene polyether having the formula:

$$Z\text{-}(\text{polyarylene polyether chain})\text{-}Z'$$

wherein Z and Z′ are each a monovalent unsaturated organo moiety. The polyarylene polyether chain can be substituted or unsubstituted. The homopolymer can be prepared from any of the vinyl reactive end-capped polyarylene polyethers taught or described herein.

A preferred class of homopolymers which are within the scope of the invention are the homopolymers of the end-capped polyarylene polyethers having the formula:

$$Z\text{-}(\text{O—E'—O—E})_n\ \text{OZ'}$$

wherein n is 2 to 300, Z and Z′ are each a monovalent unsaturated organo moiety, E is the residue after removal of the hydryoxyl groups of a dihydric phenol and E′ is the residue after removal of the two activated halo groups of an aromatic compound having two activated halo substituents. The residues represented by E and E′ being unsubstituted or substituted beyond the already defined degree.

Another preferred class of copolymers which are within the scope of the invention are the homopolymers of an end-capped polyarylene polyethers having the formula:

$$Z\text{-}(\text{O—Ar})_n\ \text{OZ'}$$

wherein n is 2 to 300, Z and Z′ are each a monovalent unsaturated organo moiety, and Ar is a divalent aromatic group that can be the same or different from one —O—Ar— group to the next, and in which each Ar group is bonded to the connecting oxy groups through aromatic carbon atoms. The aromatic group represented by Ar being substituted or unsubstituted.

As desired, monomer (B) can have one, two, three or more reactive vinyl groups, depending upon the type of copolymer wanted, speed and cost of curing, etc.

The invention also includes the process of preparing such homopolymers by homopolymerizing the end-capped polyarylene polyether monomer of the invention. The polymerization is effectively conducted in the presence of a free radical initiator, with concurrent heat application being preferred. Polymerization can also be effected by means of actinic radiation, such as ultraviolet light.

The invention further includes the copolymers comprised of:

(A) at least one monomer which is an end-capped polyarylene polyether having the formula:

$$Z\text{-}(\text{polyarylene polyether chain})\text{-}Z'$$

wherein Z and Z′ are each a monovalent unsaturated organo moiety, the polyarylene polyether chain being substituted or unsubstituted; and (B) at least one monomer having at least one monovalent unsaturated organo moiety. The copolymer can be prepared using any of the vinyl reactive end-capped polyarylene polyethers taught or described herein.

A preferred class of copolymers which are within the scope of the invention are those wherein on monomer (B) the monovalent unsaturated organo moiety is an alkylene, aralkylene or cycloalkylene moiety.

Preferably monomer (B) contains at least one reactive vinyl group $R_7R_8C{=}CR_9$—, reactive vinylidene group $R_7R_8C{=}C{=}C$—, and/or reactive vinylene group —$CR_{10}{=}CR_{11}$—. In such formula $R_7$, $R_8$, $R_9$, $R_{10}$ and $R_{11}$ each is (a) hydrogen, (b) alkyl having 1 to 4 carbon atoms, (c) alkoxy having 1 to 4 carbon atoms, (d) alkylcarboxy having 2 to 12 carbon atoms, (e) aryl having 6 to 10 carbon atoms, (f) alkoxycarbonyl having 2 to 12 carbon atoms, (g) substituted aryl having 6 carbon atom and being substituted with at least one halogen, nitrile, alkyl having 1 to 4 carbon atoms, and/or alkoxy having 1 to 4 carbon atoms, (h) aralkyl wherein the alkyl has 1 to 4 carbon atoms and the aryl has 6 to 10 carbon atoms, (i) substituted aralkyl wherein the alkyl has 1 to 4 carbon atoms, the aryl has 6 to 10 carbon atoms and the substituents are halogen, alkyl having 1 to 4 carbon atoms, nitrile and/or alkoxy having 1 to 4 carbon atoms, (j) substituted alkyl having 1 to 4 carbon atoms and being substituted with nitrile, halogen and/or alkoxy having 1 to 4 carbon atoms, (k) substituted alkylcarboxy having 2 to 12 carbon atoms and substituted with halogen, and/or nitrile, or (1) substituted alkoxycarbonyl having 2 to 12 carbon atoms and substituted with halogen, and/or nitrile. Most preferably monomer (B) is styrene.

The invention still further includes the process of preparing such copolymers by copolymerizing the end-capped polyarylene polyether monomer (A) of the invention and monomer (B) (described above). The polymerization is effectively conducted in the presence of a free radical initiator, with concurrent heat application being preferred. Polymerization can also be effected by means of actinic radiation, such as, ultraviolet light. Preferably, monomer (A) and monomer (B) are present in approximately equal stoichiometric amounts, although effectively the molar ratio of monomer (A) to monomer (B) is between 4 to 1 and 0.8 to 1.

DETAILED DESCRIPTION OF THE INVENTION

Figure 1:
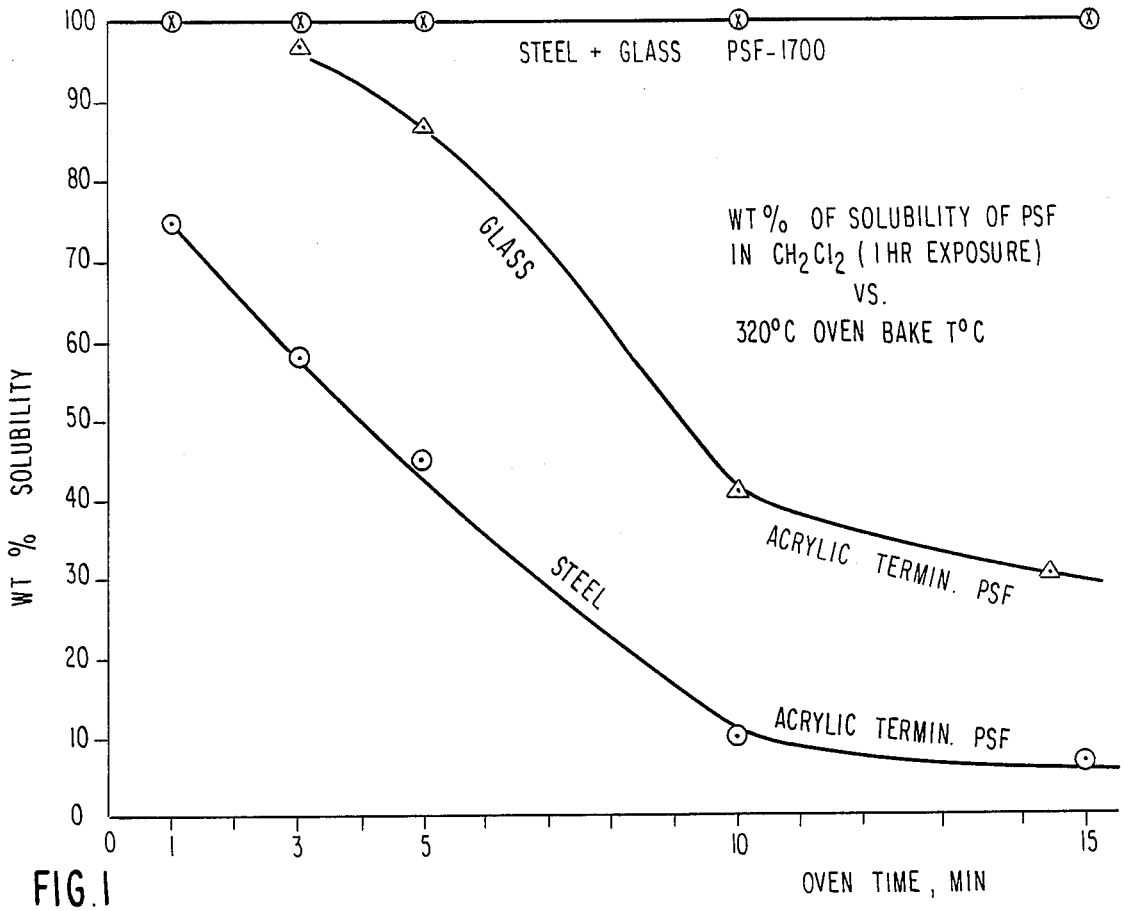
FIG. 1 is a graph of methylene chloride solubility curves for certain plated substrates.

Basically, the end-capped high molecular weight polyarylene polyether resins of the present invention are the linear thermosetting reaction products of an alkali metal double salt of a dihydric phenol and a dihalobenzenoid compound, the thermosetting resins then being end-capped with mnovalent unsaturated organo compounds. Usually a residuum of a dihydric phenol and a residuum of a benzenoid compound are both valently bonded to the ether oxygen through aromatic carbon atoms.

One convenient method of producing the compositions having the formulae:

$$Z\text{-}(\text{O}-\text{E}'-\text{O}-\text{E})_n\ \text{OZ}'$$

or $$Z\text{-}(\text{O}-\text{Ar})_n\ \text{OZ}'$$

wherein Z, Z', E, E', Ar and n are the same as defined above, is the following:

Dihydric phenol, such as, 2,2-bis(4-hydroxyphenyl)-propane ("bisphenol-A"), is dissolved in a solvent such as a mixture of monochlorobenzene and dimethyl sulfoxide. The dihydric phenol is converted to the alkali metal salt by adding an alkali metal hydroxide, such as, sodium hydroxide, an alkali metal hydride, an alkali metal hydroxide, an alkali metal alkoxide or an alkali metal alkyl compound, and removing the water of condensation by azeotropic distillation. An aromatic compound having two activated halo substituents is added to the alkali metal salt. 4,4'-Dichlorodiphenyl sulfone is illustrative of such aromatic compounds. The dihalo aromatic compound is used in a controlled proportion so that there will be a stoichiometric excess of the alkali metal salt. The dihalo aromatic compound and the alkali metal salt are reacted to form a linear polyarylene-polyether chain having alkali metal salt end groups. This compound is then reacted with an appropriate end-capping agent, such as, allyl chloride, to form a monovalent unsaturated organo end-capped polyarylene-polyether, which is recovered by coagulating the solution in anhydrous methanol or anhydrous isopropyl alcohol.

The dihydric phenol used can be a mononuclear compound such as hydroquinone or resorcinol, which may be substituted with an inert substituent such as alkyl, alkoxy or halo (with the allyl having 1 to 4 carbon atoms). In the case of hydroquinone and the like, a process using $K_2CO_3$ in dimethylacetamide is used wherein the monomers (hydroquinone, 4,4'-dichlorodiphenyl sulfone and $K_2CO_3$) are charged into the dimethylacetamide (sulfolane is also useful), and the water of reaction is removed azeotropically with toluene or the like. The dihydric phenol can also be a polynuclear phenol. Examples of polynuclear phenols are p,p-biphenol, naphthalene diol, alkane bisphenols such as bis(4-hydroxyphenyl)methane and 2,2-bis(4-hydroxyphenyl) propane, bisphenol sulfones such as bis(4-hydroxyphenyl) sulfone, the bisphenol sulfides such as bis(4-hydroxyphenyl) sulfide, the bisphenol ethers such as bis(4-hydroxyphenyl) ether, and the bisphenol ketones such as bis(4-hydroxyphenyl) ketone. The preferred dihydric phenols are hydroquinone, bisphenol-A, p,p'-biphenol and bis(4-hydroxyphenyl) sulfone.

The second class of compounds used are aromatic compounds that have two activated halo substitutents. The halo substituents are activated so that, in the absence of a catalyst, the aromatic compound can react with alkali metal phenoxide to form an ether. As is well known in the art, one way to activate the halo substituents is to have an inert electron withdrawing group ortho or para to the two halo groups. The halo-substituted aromatic compound can be a mononuclear compound, such as, 1,2,4,5-tetrabromobenzene, 1,2,4,5-tetrachlorobenzene, 2,4- and 2,6-dichlorobenzonitrile, hexachlorobenzene and 1,4-dibromo2,3,5,6-tetrachlorobenzene, or a polynuclear compound, such as, 4,4'-dichlorodiphenyl sulfone, 4,4'-bis(4-chlorophenylsulfonyl) biphenyl, 4,4 '-dichlorodiphenyl ketone, 3,4,5,3', 4',5'-hexachlorobiphenyl and 4,4'-dibromo-3,5,3',5'-tetrachlorobiphenyl.

Other useful and illustrative dihydric phenols and aromatic compounds that contain two activated halo substituents are disclosed in U.S. Pat. Nos. 3,539,656, 3,539,657, 3,355,272, 3,634,354, 3,928,295 and 3,764,583, the pertinent portions of which are incorporated herein by reference.

The foregoing outline of a process for producing the above-identified compositions can be represented by the sequence of reaction steps presented below in which HO-E-OH represents the dihydric phenol and Cl—E'—Cl represents the dihalo aromatic compound:

$$\text{HO}-\text{E}-\text{OH} + 2\text{NaOH} \longrightarrow \underset{(\text{A})}{\text{NaO}-\text{E}-\text{ONa}} + 2\text{H}_2\text{O} \quad (1)$$

$$(n+1)\text{A} + n\text{Cl}-\text{E}'-\text{Cl} \longrightarrow \underset{(\text{B})}{\text{NaO}-\text{E}\text{-}(\text{O}-\text{E}'-\text{O}-\text{E})_n\text{ONa}} + 2n\text{NaCl} \quad (2)$$

-continued $$B + 2Cl{-}Z \text{ (or } Z') \longrightarrow Z{-}O{-}E\langle E'{-}O{-}E\rangle_n O{-}Z + 2NaCl \quad (3)$$

In the above sequence of reaction steps (1), (2) and (3), the dihydric phenol is preferably employed in a stoichiometric excess over the dihalo aromatic compound. Preferably from about 1.02 to about 1.16 moles of dihydric phenol is employed per mole of the dihalo aromatic compound. Within this range of properties, the reduced viscosities in chloroform at 25° C. and at a concentration of 0.2 gram of polymer per 100 milliliters of solution, of the polyarylene polyethers and the end-capped polymers derived therefrom, usually will be within the range of from about 0.1 to 0.5 dl/g. (Reduced viscosity is determined by the procedure of ASTM-D-2857.) Proportions outside this range can also be used in some cases when it is desired to produce end-capped polymers of either higher or lower molecular weights. (dg/g means deciliter per gram.)

The above sequence of reaction steps (1), (2) and (3) is the most convenient way to produce the above-identified compositions. However, variations of the procedure are well within the skill of the art and are contemplated by this invention. For instance, reaction step (2) can be carried out with an excess of the dihalo compound (the preferred proportion of stoichiometric excess being the same as that given above for the dihydric phenol), followed by an alkaline hydrolysis reaction to convert the halo substituent to alkali metal phenoxide. Then, after azeotropic removal of water, the product is subjected to reaction step (3). Alternatively, the "single salt process" can be employed (e.g. as described in British Pat. No. 1,369,156) to produce a polyarylene polyether terminated at one end by a halo substituent and at the other by alkali metal phenoxide. Upon alkaline hydrolysis of the halo group, followed by dehydration, the product can then be subjected to Reaction (3), as described herein.

In the first step, that is, reaction step (1), the dihydric phenol is converted to the corresponding alkali metal salt. Two moles of alkali metal hydroxide, such as sodium hydroxide or potassium hydroxide, are reacted per mole of dihydric phenol. Almost exactly stoichiometric quantities should be used. This reaction is carried out in a solvent system that permits azeotropic removal of the water of condensation. A mixture of monochlorobenzene (MCB) and dimethyl sulfoxide (DMSO) is excellent for this purpose. The DMSO is used as the solvent, and MCB is an azeotroping agent. Other useful solvents include dimethylacetamide (DMAC), and other useful azeotroping agents include chlorinated benzenes, benzene, toluene, and xylene. The condensation reaction to produce the alkali metal phenoxide normally is conducted from about 120 to about 240 minutes at a temperature of from about 110° to about 132° C. While a much broader temperature range can be used, the above one is the most convenient.

After the water of condensation has been removed azeotropically, the dihalo aromatic compound is added to the reaction mixture to carry out reaction step (2). This reaction is carried out at an elevated temperature, for example, from about 150° C. to about 170° C., for a period of from about 60 to about 120 minutes.

Upon completion of reaction step (2), a polyarylene polyether having alkali metal phenoxide end groups is produced. This composition is reacted with a monovalent unsaturated organo compound to produce the end-capped polyarylene polyether resins of the invention.

Generally the monovalent unsaturated organo moiety is selected from the group consisting of:

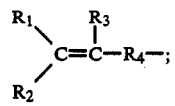

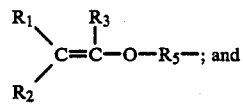

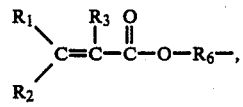

wherein $R_1$, $R_2$ and $R_3$ each is hydrogen, an aliphatic hydrocarbon radical containing 1 to 20 carbon atoms, an alicyclic hydrocarbon radical containing 1 to 20 carbon atoms or an aromatic radical, and $R_4$, $R_5$ and $R_6$ each is a divalent alkylene radical containing 1 to 20 carbon atoms, a divalent arylene radical containing 6 to 10 carbon atoms or a divalent cycloalkylene radical containing 3 to 8 carbon atoms. Preferably $R_1$, $R_2$ and $R_3$ each is hydrogen, an alkyl radical having 1 to 8 carbon atoms, an aryl radical, an aralkyl radical, an alicyclic radical having 3 to 8 carbon atoms or a bicyclic radical. Preferably $R_4$, $R_5$ and $R_6$ each is a divalent alkylene radical having 1 to 8 carbon atoms. Typical aromatic radicals are benzyl, phenyl and naphthyl. Typical alkyl radicals are methyl, ethyl, 2-propyl, 1-propyl, 1-butyl, 2-methyl-1-propyl, 2-butyl, 1-pentyl, 3-metyl-1-butyl, 2-pentyl, 3-pentyl, 3-methyl-2-butyl, 1-hexyl, 2-ethyl-1-butyl, 2-metyl-1pentyl, 3-methyl-1-pentyl, 2,3-dimethyl-1-butyl, 3-methyl-2pentyl, 4-methyl-2-pentyl, 2,3-dimethyl-2-butyl, 1-heptyl, 2,4-dimethyl-3-pentyl, 1-octyl, 2-octyl, 1-dodecyl, 1-octadecyl and 1-hexadecyl. Examples of aromatic radicals are benzyl, methyl benzyl, o-, m- and p-dimethylbenzyl, ethylbenzyl, trimethyl benzyl, n-propylbenzyl and isopropylbenzyl. Examples of alicyclic and bialicyclic radicals are cyclobutyl, cyclopropyl methyl, cyclopropyl, cyclopentyl, cyclopentyl methyl, cyclohexyl, cyclohexyl methyl and cyclooctyl. Examples of divalent alkylene radicals are $-CH_2-$, $-CH_2CH_2-$, $-(CH_2)_3-$, $-(CH_2)_5-$,

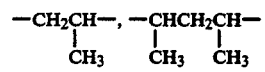

and $-(CH_2)_{12}-$. Examples of divalent arylene radicals are $-C_6H_4-$ (o, m and p), and $-C_{10}H_6-$. Examples of divalent cycloalkylene radicals are

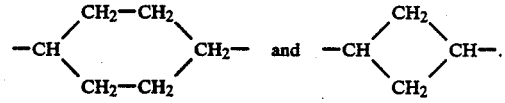

The preferred halide end-capping agents are allyl chloride, 2-chloroethylacrylate, 2-chloroethylmethacrylate, chloromethyldimethylvinylsilane, vinyl benzyl chloride and 2-chloroethyl vinyl ether.

Examples of useful halides for end-capping are: allyl chloride ($CH_2{=}CH{-}CH_2Cl$), allyl fluoride, allyl bromide, 1-propenyl chloride ($CH_3CH{=}CHCl$), 1-propenyl fluoride, 1-propenyl bromide, $CH_3CH{=}CHCH_2Cl$, $CH_2{=}CHCH_2CH_2Cl$, $CH_2{=}CHCH_2$, $CH_2F$, $CH_2{=}CH(CH_2)_3Cl$, CHhd $2{=}CHCH_2CH_2CH_2Cl$, $CH_3CH{=}CHCH_2CH_2Cl$, $CH_2{=}C(CH_3)CH_2CH_2Cl$, $CH_2{=}CHCH_2CH_2CH_2CH_2Cl$, vinyl benzyl chloride, vinyl benzyl floride, vinyl benzyl bromide, 3-phenylpropenyl chloride,

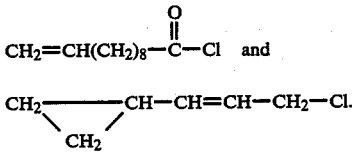

The thermoplastic polyarylene polyethers are rendered "cross-linkable" through the incorporation of unsaturated moieties This is accomplished conveniently by replacing saturated agents, such as, methyl chloride, an end-capping reagent, with an unsatuxated reagent. The resulting resins contain unsaturated group at the chain ends. The composition is cross-linkable in the presence of a suitable free radical initiator. Upon curing these end-capped polysulfone compositions have been shown to provide improved stress-cracking resistance and better adhesive properties. They are also useful for various polymer modification purposes particularly as a "rigid block" in forming block and graft copolymers.

The end-capping reaction, i.e., reaction step (3), is carried out by reacting the monovalent unsubstituted organo compound with the alkali metal phenoxide-capped polyarylene polyether resin produced by reaction step (2). The stoichiometric proportions are two moles of unsubstituted organo compound per mole of polyarylene polyether resin. It is preferred to employ about a 2 to 10 mole percent stoichiometric excess of the unsubstituted organo compound. The reaction mixture preferably should be substantially anhydrous. The reaction medium can be the same solvent system that was employed for reaction steps (1) and (2). The reaction is carried out at elevated temperatures, e.g., at from about 110° C. to about 165° C. At the recommended temperature range, the reaction will usually take from about 10 to about 90 minutes. The completion of the reaction can be detected by treating a sample of the reaction mixture with bromocresol purple indicator. When the alkali metal phenoxide has reacted, the treated sample will be greenish yellow in color.

At the completion of the reaction, the reaction mixture can be cooled, filtered to remove salt by-product, and then the end-capped polyarylene polyether resin can be recovered by coagulation in a non-solvent for the resin, e.g., methanol or isopropyl alcohol. Preferably the reaction mixture and the resin is kept anhydrous until the resin has been recovered as a solid.

The substantially equimolar one-step reaction of a double alkali metal salt of a dihydric phenol with a dihalobenzenoid compound is done in the presence, for example, of specific liquid organic sulfoxide or sulfone solvents under substantially anhydrous conditions. Catalysts are not necessary for this reaction. Another feature of the invention involves simultaneously contacting substantially equimolar amounts of an alkali metal double salt of a dihydric phenol and a dihalobenzenoid compound with a solvent mixture comprising an azeotrope former and a sulfoxide or sulfone reaction solvent in a weight ratio of from about 10:1 to about 1:1, preferably from about 4:1 to about 3:1, removing water from the reaction mass as an azeotrope with the azeotrope former until substantially anhydrous conditions are attained, adjusting the ratio of azeotrope former to reaction solvent from about 1:1 to about 1:10, preferably from about 1:3 to about 1:4, by removing excess azeotrope former, and reacting the alkali metal double salt with the dihalobenzenoid compound in the liquid phase of the sulfoxide or sulfone reaction solvent.

The useful sulfoxide or sulfone solvents are those of the formula:

wherein each R represents a monovalent lower hydrocarbon group free of aliphatic unsaturation of the alpha carbon atom, and preferably contains less than about 8 carbon atoms or when connected together represents a divalent alkylene group with v being an integer from 1 to 2 inclusive. Thus, in all of these solvents all oxygens and two carbon atoms are bonded directly to the sulfur atom. Thus, contemplated for use in the invention are such solvents as those having the formula:

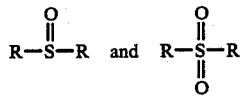

wherein the R groups are lower alkyl, such as methyl, ethyl, propyl, butyl and like groups and aryl groups such as phenyl and alkyl phenyl groups as well as those where the R groups are interconnected as in a divalent alkylene bridge, such as:

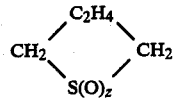

as in thiophene oxides and dioxides. Specifically mentionable of these solvents but by no means exhaustive of these solvents are dimethylsulfoxide, dimethylsulfone, diethylsulfoxide, diethylsulfone, diisopropylsulfone, tetrahydrothiophene 1,1-dioxide (commonly called tetramethylene sulfone or sulfolane) and tetrahydrothiophene-1 monooxide. The dimethylsulfoxide has been found to be the most useful as the solvent for this reaction because it is a solvent for the widest variety of reactants as well as for the resulting polymer of the reaction. Aliphatic unsaturation on the alpha-carbon atom, such as occurs in divinyl sulfone and sulfoxide, should not be present as such materials tend to be reactive and polymerize under the conditions of this reaction. However, unsaturation on a beta-carbon atom or one further removed from the sulfur atom can be tolerated and such solvents can be employed in this reaction.

In situations where it is desired to prepare the alkali metal salt of the dihydric phenol in situ in the reaction solvent, the dihydric phenol and an alkali metal hydroxide are admixed in essentially stoichiometric amounts and normal precautions taken to remove all the water of neutralization preferably by distillation of a water-containing azeotrope from the solvent-metal salt mixture. It has been convenient to employ benzene, xylene, halogenated benzenes or other inert organic azeotrope-forming organic liquids in performing this. Heating the alkali metal hydroxide, dihydric phenol and small amounts of the azeotrope former to reflux for several hours while removing the azeotrope is the most desirable. However, it is obvious that any other technique for removing essentially all of the water can be equally satisfactory.

It is not essential and critical in this reaction that all of the azeotropic former be removed before the reaction of the alkali metal salt of the bisphenol with the dihalobenzenoid compound. In fact, it is desirable in some instances to employ an amount of such material in excess of that needed to azeotrope off all of the water, with the balance being used as a co-solvent or inert diluent with the sulfone or sulfoxide principal solvent. Thus, for instance, benzene, heptane, xylene, toluene, chlorobenzene, dichlorobenzene or like inert liquids can be beneficially employed.

The azeotrope former can be one either miscible or immiscible with the sulfone or sulfoxide major solvent. If it is not miscible it should be one which will not cause precipitation of the polymer in the reaction mass. Heptane is such a solvent. When employed, it will merely remain inert and immiscible in the reaction mass. If the azeotrope former would cause precipitation of the polymer, it should be removed almost completely from the reaction mass before initiating polymerization. For such reasons, it is preferred to employ azeotrope formers which are miscible with the major solvents and which also act as co-solvents for polymer during polymerization. Chlorobenzene, dichlorobenzene and xylene are azeotrope formers of this class. Preferably the azeotrope former should be one boiling below the decomposition temperature of the major solvent and be perfectly stable and inert in the process, particularly inert to the alkali metal hydroxide when the alkali metal salt of the dihydric phenol is prepared in situ in the presence of the inert diluent or azeotrope former. It has been found that chlorobenzene and o-dichlorobenzene serve particularly well as the inert diluent and are able to significantly reduce the amount of the sulfone or sulfoxide solvent necessary. The co-solvent mixture using even as much as 50 percent of the halogenated benzene with dimethylsulfoxide, for example, not only permits the formed polymer to remain in solution and thus produce high molecular weight polymers, but also provides a very economical processing system, and an effective dehydration operation.

Any of the alkali metal hydroxides can be employed in this technique, that is to say any alkali metal salt of the dihydric phenol can be used as the one reactant. Potassium and cesium salts have been found to react considerably faster than the sodium salts, but due to expense of the cesium salts, the potassium salts are preferred. As heretofore indicated, the alkali metal salt should, of course, be the double metal salt, i.e., both aromatic hydroxyl groups being saponified, in order to prepare these products. Single metal salts ordinarily limit the molecular weight of the product. While this may be desirable as a chain terminator or molecular weight regulator near the terminus of the reaction period, the initial reaction and the major portion thereof should be with the double alkali metal salt of the dihydric phenol. The alkali metal moieties of this compound however can be the same or different alkali metals.

Substantially equimolar amounts of the alkali metal double salt of a dihydric phenol (or a dihydric phenol for in situ conversion to the salt) and a dihalobenzenoid compound are simultaneously contacted with a solvent mixture comprising an azeotrope former and a sulfoxide or sulfone reaction solvent in a ratio of from about 10:1 to about 1:1 by weight based on the combined weight of the azeotrope former and reaction solvent. When water is present in this solvent mixture, a phase separation occurs even between normally miscible liquids creating two liquid phases. When this phase separation occurs, the water and hydrated alkali metal double salt of a dihydric phenol are preferentially dissolved in the sulfoxide or sulfone reaction solvent phase and the dihalobenzenoid compound is preferentially dissolved in the azeotrope former phase. The initial ratio of azeotrope former to reaction solvent is critical in this respect because with lesser amounts of azeotrope former, two liquid phases are not formed and undesirable hydrolysis of the dihalobenzenoid compound occurs. Only when the ratios specified are used does a phase separation occur which isolates the dihalobenzenoid compound from hydrolysis by the water in the system.

If dry crystalline alkali metal salt of a dihydric phenol is employed, problems relative to obtaining anhydrous conditions are essentially avoided. However, drying the salt and keeping it dry during transfer and charging is difficult. It is more advantageous to employ a hydrated alkali metal salt which is dehydrated in the reaction mass by removing the water of hydration. Water then can be present or formed in the reaction mass as the water of hydration of a hydrated alkali metal salt, as the water of neutralization formed during the in situ conversion of a dihydric phenol to the alkali metal double salt, or as water present in either the azeotrope former or the reaction solvent. During the in situ conversion, the hydrated salt is formed first which is then dehydrated upon the removal of water.

When the two liquid phases are formed, it is important that the water in the system be removed as quickly as possible, usually by refluxing the mixture at about the boiling point of the azeotrope former until substantially all of the water is removed. During the water removal, the dehydrated alkali metal double salt, which is insoluble in the reaction solvent at the reflux temperatures, precipitates. The fact that all the water has been removed is usually signaled by no further precipitate formation, no further azeotrope formation, and the formation of one liquid phase when miscible liquids are used. After the water has been removed, excess azeotrope former is removed by distillation until the ratio of azeotrope former to sulfoxide or sulfone reaction solvent is about 1:1 to 1:10. Only when the amount of azeotrope former is reduced to within these ratios, does significant polymerization occur.

The residuum of the dihydric phenol of these alkali metal salts is not narrowly critical. It can be, for instance, a mononuclear phenylene group as results from hydroquinone and resorcinol, or it may be a di- or polynuclear residuum. Likewise the residuum be substituted with other inert nuclear substituents such as halogen, alkyl, alkoxy and like inert substituents.

From a practical standpoint, limitations on polymer molecular weights can be expected when the dihydric phenol or the alkali metal derivative thereof contain strong electron withdrawing groups. This may result in lower molecular weight polymers or impractically slow reaction rates. Hence, the dihydric phenol should be a weakly acidic dinuclear phenol, such as, the dihydroxy diphenyl alkanes or the nuclear halogenated derivatives thereof, such as, the 2,2- bis(4-hydroxyphenyl)propane, 1,1-bis(4-hydroxyphenyl)2-phenyl ethane, bis(4-hydroxyphenyl)methane, or the chlorinated derivatives containing one or two chlorines on each aromatic ring. While these halogenated bisphenolic alkanes are more acidic than the non-halogenated bisphenols and hence slower in reactivity in this process, they do impart valuable flame resistance to these polymers. Other materials also termed appropriately "bisphenols" are also highly valuable and preferred. These materials are the bisphenols of a symmetrical or unsymmetrical joining group, as, for example, ether oxygen (—O—), carbonyl $(-\overset{\overset{\displaystyle O}{\|}}{C}-)$ sulfide (—S—), sulfone $(-\overset{\overset{\displaystyle O}{\|}}{\underset{\underset{\displaystyle O}{\|}}{S}}-)$, or hydrocarbon residue in which the two phenolic nuclei are joined to the same or different carbon atoms of the residue such as, for example, the bisphenol of acetophenone, the bisphenol of benzophenone, the bisphenol of vinyl cyclohexene, the bisphenol of alpha-pinene, and the like bisphenols where the hydroxyphenyl groups are bound to the same or different carbon atoms of an organic linking group.

Such dinuclear phenols can be characterized as having the structure:

$$HO(\overset{\overset{\displaystyle (Y)_m}{|}}{Ar}-R-\overset{\overset{\displaystyle (Y_1)_z}{|}}{Ar})OH$$

wherein Ar is an aromatic group and preferably is a phenylene group, Y and $Y_1$ can be the same or different inert substituent groups as alkyl groups having from 1 to 4 carbon atoms, halogen atoms, i.e., fluorine, chlorine, bromine or iodine, or alkoxy radicals having from 1 to 4 carbon atoms, m and z are integers having a value from 0 to 4, inclusive, and R is representative of a bond between aromatic carbon atoms as in dihydroxydiphenyl, or is a divalent radical, including for example, inorganic radicals as $$-\overset{\overset{\displaystyle O}{\|}}{C}-,$$

—O—, —S—, —S—S—, $-SO_2-$, and divalent organic hydrocarbon radicals such as alkylene, alkylidene, cycloaliphatic, or the halogen, alkyl, aryl or like substituted alkylene, alkylidene and cycloaliphatic radicals as well as alkalicyclic, alkarylene and aromatic radicals and a ring fused to both Ar groups.

Examples of specific substituted dihydric polynuclear phenols include among others: the substituted bis-(hydroxylphenyl)alkanes, such as, 2,2-bis-(4-hydroxyphenyl)propane, 2,4'-dihydroxydiphenyl methane, bis-(2-hydroxyphenyl)methane, bis-(4-hydroxyphenyl)methane, bis(4-hydroxy-2,6-dimethyl-3-methoxyphenyl)methane, 1,1-bis-(4-hydroxyphenyl)ethane, 1,2-bis-(4-hydroxyphenyl)ethane, 1,1-bis(4-hydroxy-2-chlorphenyl)ethane, 1,1-bis-(3-methyl-4-hydroxyphenyl)propane, 1,3-bis-(3-methyl-4-hydroxyphenyl)-propane, 2,2-bis-(3-phenyl-4-hydroxyphenyl)propane, 2,2-bis-(3-isopropyl-4-hydroxyphenyl)propane, 2,2-bis-(2-isopropyl-4-hydroxyphenyl)propane, 2,2-bis(4-hydroxynaphthyl)propane, 2,2-bis-(4-hydroxyphenyl)-pentane, 3,3-bis-(4-hydroxyphenyl)pentane, 2,2-bis-(4-hydroxyphenyl)heptane, bis-(4-hydroxyphenyl)-phenylmethane, 2,2-bis-(4-hydroxyphenyl)-1-phenylpropane, 2,2-bis-(4-hydroxyphenyl)1,1,1,3,3,3,hexafluoropropane and the like; the substituted di(hydroxyphenyl)sulfones, such as, bis-(4-hydroxyphenyl)sulfone, 2,4'-dihydroxydiphenyl sulfone, 5'-chloro-2,4'-dihydroxydiphenyl sulfone, 5'-chloro-4,4'-dihydroxydiphenyl sulfone and the like; and the substituted di(hydroxyphenyl)ethers, such as, bis-(4-hydroxyphenyl)ether, the 4,3'-, 4,2'-, 2,2'- and 2,3'-dihydroxydiphenyl ethers, 4,4'-dihydroxy-2,6-dimethyldiphenyl ether, bis-(4-hydroxy-3-isobutylphenyl)ether, bis-(4-hydroxy-3-isopropylphenyl)ether, bis-(4-hydroxy-3-chlorophenyl)ether, bis-(4-hydroxy-3-fluorophenyl)ether, bis-(4-hydroxy-3-bromophenyl)ether, bis-(4-hydroxynaphthyl)ether, bis-(4-hydroxy 3-chloronapthyl)ether, 4,4'-dihydroxyl-3,6-dimethyoxydiphenyl ether, 4,4'-dihydroxy-2,5-diethoxydiphenyl ether and the like.

In the invention a mixture of two or more different dihydric phenols can be used. Thus, herein the —E— or —E'— residuum in the polymer structure can actually be the same or different aromatic residue. As herein used the term E or E' when defined as being the "residuum of the dihydric phenol" of course refers to the residue of the dihydric phenol after the removal of the two aromatic hydroxyl groups. Thus as is readily seen these polyarylene polyethers contain recurrding groups of the residuum of the dihydric phenol and the residuum of the benzenoid compound bonded through aromatic ether oxygen atoms.

Any dihalobenzenoid compound or mixture of dihalobenzenoid compounds can be employed in the invention which compound or compounds has the two halogens bonded to benzene rings having an electron withdrawing group in at least one of the positions ortho and para to the halogen group. The dihalobenzenoid compound can be either mononuclear where the halogens are attached to the same benzenoid ring or poly nuclear where they are attached to different benzenoid rings, as long as there is an activating electron withdrawing group in the ortho or para position of that benzenoid nucleus. Any of the halogens may be the reactive halogen substituents on the benzenoid compounds. Fluorine and chlorine substituted benzenoid reactants are preferred; the fluorine compounds for fast reactivity and the chlorine compounds for their inexpensiveness. Fluorine substituted benzenoid compounds are most preferred, particularly when there is a trace of water present in the polymerization reaction system. However, this water content should be maintained below about 1 percent and preferably below 0.5 percent for best results.

Any electron withdrawing group can be employed as the activator group in these compounds. It should be, of course, inert to the reaction, but otherwise its structure is not critical. Preferred are the strong activating groups such as the sulfone group $$(-\overset{\overset{\displaystyle O}{\|}}{\underset{\underset{\displaystyle O}{\|}}{S}}-)$$

bonding two halogen substituted benzenoid nuclei as in the 4,4'-dichlorodiphenyl sulfone and 4,4'- difluorodiphenyl sulfone, although such other strong withdrawing groups can also be used. The more powerful of the electron withdrawing groups give the fastest reactions and hence are preferred. It is further preferred that the ring contain no electron supplying groups on the same benzenoid nucleus as the halogen; however, the presence of other groups on the nucleus or in the residuum of the compound can be tolerated. Preferably, all of the substituents on the benzenoid nucleus are either hydrogen (zero electron withdrawing), or other groups having a positive sigma value [as set forth in J. F. Bunnett, Chem. Rev. 49,273 (1951), and Quart. Rev., 12, 1 (1958)]. The electron withdrawing group of the dihalobenzenoid compound can function either through the resonance of the aromatic ring, as indicated by those groups having a high sigma value, i.e., above about +0.7, or by induction as in perfluoro compounds and like electron sinks. Preferably the activating group should have a high sigma value, preferably above 1.0, although sufficient activity to promote the reaction is evidence in those groups having a sigma value above 0.7, although the reaction rate with such a low powered electron withdrawing group may be somewhat low.

The activating group can be basically either of two types:

(a) monovalent groups that activate one or more halogens on the same ring as a nitro group, phenylsulfone, or alkylsulfone, cyano, trifluoromethyl, nitroso, and hetero nitrogen as in pyridine; or (b) divalent group which can activate displacement of halogens on two different rings, such as the sulfone group

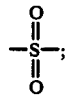

the carbonyl group

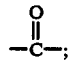

the vinyl group

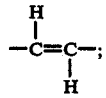

the sulfoxide group

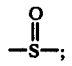

the azo-group —N=N; the saturated fluorocarbon groups $—CF_2CF_2—$; organic phosphine oxides

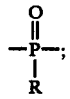

wherein R is a hydrocarbon group, and the ethylidene group

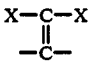

where X can be hydrogen or halogen or which can activate halogens on the same ring such as with difluorobenzoquinone, 1,4- or 1,5- or 1,8-difluoroanthraquinone.

A plurality of electron withdrawing groups can be employed if desired, including electron withdrawing groups having a sigma value below about +0.7, provided the cumulative sigma influence on each of the reactive halogen groups of the halobenzenoid compound is at least about +0.7. If desired, the polymers may be made with mixtures of two or more dihalobenzenoid compounds each of which has this structure, and which may have different electron withdrawing groups.

As used herein, the term E or E' when defined as being the "residuum of the benzenoid compound" refers to the aromatic or benzenoid residue of the compound after the removal of the halogen atoms on the benzenoid nucleus.

Dimethylsulfoxide decomposes at its boiling point, i.e., about 189° C.; it is desirable to keep the reaction temperature below this to avoid such problems when employing this solvent.

The reaction temperature can be effectively increased even above the normal boiling point of the solvent or mixture of solvents by the use of pressure in the system. However, for most practical reactions contemplated herein, atmospheric pressures are quite adequate, though if desired pressures as high as 1000 psig or more can be employed.

The molecular weight of the polymer can be easily controlled in this process by the addition of a precipitating solvent to the reaction mixture when the desired reduced viscosity of the resin is secured or when the indicated viscosity of the polymerization mass is high enough to indicate the desired molecular weights are achieved. It is also possible to terminate the growing polymer chain by the addition of a monofunctional chain stopper, such as an alkyl halide or other suitable coreactant.

The molecular weight of the end-capped resins is indicated by reduced viscosity in indicated solvents. The viscosity of a resin solution bears a direct relationship to the weight average molecular size of the resin chains, and can be used to characterize the degree of polymerization. The reduced viscosity values used herein are of significance only relative to each other rather than in any absolute sense, and for this reason other polyether-solvent systems can be employed as an indication of the relative molecular weight of these resins. When solvents other than chloroform are employed, the required average molecular size relationship can readily be established by reference to the reduced viscosity values defined herein even though the numerical reduced viscosity values of the alternative system may be different.

In the in situ process (conversion) the preferred solvent is dimethylacetamide; the process uses $K_2CO_3$.

The preferred class of end-capped thermosetting resins of the invention are those polysulfone where the thermosetting polyarylene polyether resin is composed of recurring units having the formula:

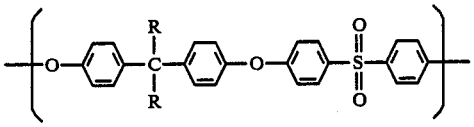

wherein R is hydrogen, lower alkyl, lower aryl and halogen substituted lower alkyl and lower aryl groups. Most preferably R is methyl. The lower alkyl groups have from 1 to 4 carbon atoms.

As used herein, the polysulfone-vinyl reactive resins or PSF-VR are the above end-capped resins when R is methyl and the end-capping moieties are alkylene, aralkylene or cycloalkylene moieties.

Also as used herein, the (prior art) polysulfone-silane reactive resins or PSF-SR refer to silane end-capped polyarylene polyether polymers made from bisphenol-A and dihalodiphenylsulfone. (See U.S. Pat. No. 4,093,600 and 4,183,874.)

Because of their thermoset nature, the cured polysulfonevinyl reactive resins exhibit a markedly improved environmental stress-crack resistance and a better dimensional stability at elevated temperatures than those of the thermoplastic polysulfone.

The polysulfone-vinyl reactive resin is prepared by a two step process, namely, polymerization followed by end-capping. In the polymerization step, bisphenol A and dihalodiphenylsulfone are polymerized in the presence of an alkali metal hydroxide, an alkali metal oxide and/or ammonium hydroxide. A deficient amount of sulfone monomer is used during the polymerization to produce the desired sodium phenate terminated oligomers. By varying the sulfone monomer/bisphenol A charge ratio, polysulfone-vinyl reactive resin of a wide range of molecular weights can be prepared.

The sequence of reactions of the preparation process of the invention is represented schematically below wherein the end-capping reagent is vinyl benzyl chloride:

SCHEMATIC PRESENTATION OF POLYSULFONE-VINYL REACTIVE PREPARATION

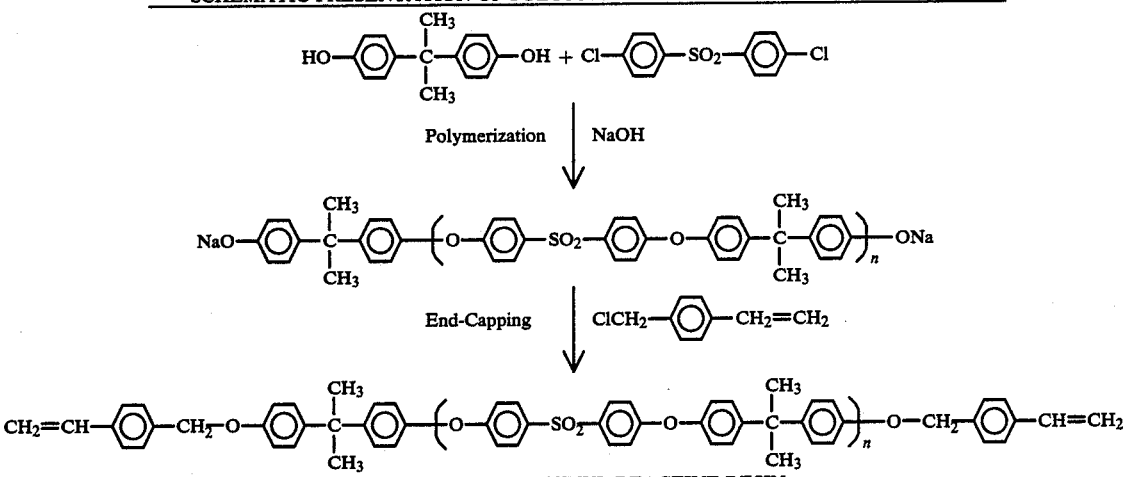

POLYSULFONE-VINYL REACTIVE RESIN

In the polymerization step, the preferred alkali metal hydroxide is sodium hydroxide. Useful alkali metal hydroxides include lithium hydroxide, potassium hydroxide, rubidium hydroxide and cesium hydroxide. Useful alkali metal oxides include sodium oxide, lithium oxide, potassium oxide, rubidium oxide and cesium hydroxide. Ammonium hydroxide is also useful in the polymerization step in place of the sodium hydroxide.

The polymerization step is carried out at a temperature preferably between 163° and 165° C. in a mixed solvent composed of dimethyl sulfoxide (DMSO) and monochlorobenzene (MCB), although any other suitable solvent(s) such as dimethyl acetamide (DMAC) can also be employed. Any suitable polymerization temperature (e.g., 120° to 185° C.) can be used. Precautions which are normally observed during the preparation of standard polysulfone are equally important here to achieve quality products. Of particular importance is the caustic charge which affects both the "color" and "stability" of the finished polysulfone-vinyl reactive resin in addition to its anticipated effect on the molecular weight and composition of the latter.

Useful polar solvents include: alcohols, such as, methanol, ethanol, n-propyl alcohol, n-butyl alcohol, amyl alcohol, isopropyl alcohol, sec-butyl alcohol, isobutyl alcohol and 4-methyl 2-pentanol; ethers, such as ethyl ether, diethyl Cellosolve and butyl ether; aldehydes, such as, benzaldehyde and furfural; triethyl phosphate; and amides, such as, N,N-dimethyl formamide, acetamide and butramide.

In the end-capping or terminating step, the alkali oxy (e.g., NaO—) end groups of the polysulfone are reacted with a halo organo compound containing a terminal or near terminal unsaturated group.

The compounds used for end-capping or terminating are halogenated, unsaturated compounds. The end-capping reagents are described by the generic formula:

XZ wherein X is a halogen, preferably chlorine, and Z is an unsaturated organic radical. More specifically, Z is usually a reactive, unsaturated radical having an alkylene, aralkylene or cycloalkylene moiety (linked to the halogen). Most halophenyl compounds have limited reactivity.

Examples of the preferred end-capping reagents are allyl chloride, 2-chloroethylacrylate, 2-chloroethylmethacrylate, chloromethyldimethylvinylsilane, vinyl benzyl chloride and 2-chloroethyl vinyl ether.

The halo organo compound reacts like an alkyl halogen with the alkali oxy end groups. Although end-capping is preferably done at a temperature of 115° to 120° C., no deleterious effect was usually evident even when the end-capping was performed at the preferred polymerization temperature which is from 163° to 165° C. Because of a much greater reaction rate at the latter temperature, the required reaction time is shortened drastically. Apparently a more complete reaction also results at the high temperature levels due to lower viscosities. Any suitable temperature can be used in the end-capping step.

Preferably anhydrous condition during the end-capping stage, coupled with a reasonably good hydrolytic stability of the halo organo compound, is used whereby premature gelation of the polysulfone-vinyl reactive resin is normally not a problem in the reactor. Upon completion of the end-capping step, the reaction mixture should be neutral which can be readily diluted with dry monochlorobenzene (or other suitable solvent) and filtered without difficulty. However, the presence of residual alkalinity, which may result from either a deficiency in end-capping reagent charged or an incompletion in reaction, can cause problems during subsequent filtering when the polymer solution is exposed to either atmospheric moisture and/or wet diluent. For this reason a speedy product recovery is recommended whenever the above circumstance is present or suspected.

The preferred (average) molecular weight of the polysulfone-vinyl reactive resin is between 5,000 and 15,000, although higher and lower molecular weights are within the scope of the invention. The polysulfone-vinyl reactive resin can range in size from oligomer to polymer. The average molecular weight of the polysulfone-vinyl reactive resin can be determined by the NMR technique.

The polysulfone-vinyl reactive resin can be separated or recovered from the reaction mixture by any appropriate method, but the coagulation method and the melt recovery process are preferred Recovery by coagulation is normally done in isopropanol (or methanol). The melt recovery production process involves removing the solvents by passing the polymer solution through a recovery system consisting of a concentrator, a devolatilizer and a Marshall mill.

While polysulfone-silane reactive resins are outside of the scope of the invention, they are frequently used herein for comparitive purposes. The polysulfone-silane reactive resins are structurally very similar to the polysulfone-vinyl reactive resins of the invention, except for the end-capping by reaction with silane groups such as 3-chloropropyltrimethoxysilane. The production process is very similar for the two types of end-capped polysulfones. The polysulfone-silane reactive resins have been prepared in a broad range of molecular weights by varying the monomer feed ratio in the synthesis of the oligomers. The polysulfone-silane reactive resins have excellent hydrolytic stability in bulk form below their glass transition temperature. They can even be suspended in water without premature gelation. Cross-linking occurs readily above the glass transition temperature, and the cure rate can be further increased by prehydrolysis of the silylalkoxy end groups or by the use of catalysts. Cross-linked polysulfone-silane reactive resins have mechanical and electrical properties comparable to those of standard polysulfone. Cured polysulfone-silane reactive may enable higher use temperature limits than thermoplastic polysulfone resins, and large improvements over such thermoplastic polysulfone resins are found in their solvent resistance (environmental stress crack resistance). Also, due to the silane end groups, a built-in bonding capability exists towards many inorganic and metallic surfaces Concerning the polysulfone-vinyl resins in Table IV below, there was not any evidence of thermally initiated polymerization of the reactive end groups during the end-capping step. Preferably, however, the reaction temperature is kept below 125° C. during the end-capping step and the system is kept under positive nitrogen pressure throughout.

Due to the absence of moisture sensitive end groups, the polysulfone-vinyl reactive resins are usually easier to handle than polysulfone-silane reactive resins during preparation. Once the end-capping reaction is complete, the polysulfone-vinyl reactive resins may be exposed to water or wet solvent without being affected. The only exceptions, however, are the polysulfone-vinyl reactive resins having methacryloxy or acryloxy end groups which are hydrolized readily by moisture. For this reason, the chloroalkyl esters of such are preferred.

Unlike the polysulfone-silane reactive resin which has three reactive sites for each end-group, the end-groups of all of the polysulfone-vinyl reactive resins shown in Table I are monofunctional. This difference requires that a precise stoichiometry of the reactants be maintained in order to produce the desire curable product, that is, a completely end-capped resin. When there is either an excess amount of bisphenol A or a deficiency in caustic charge (NaOH), a lower end-capping efficiency will result.

When 2-chloroethyl methacrylate (acrylate) is employed, the occurrence of dehydrochlorination during the end-capping step becomes a possibility. An excess amount of end-capping reagent is usually added to offset any potential loss due to side reactions.

Figure 3:
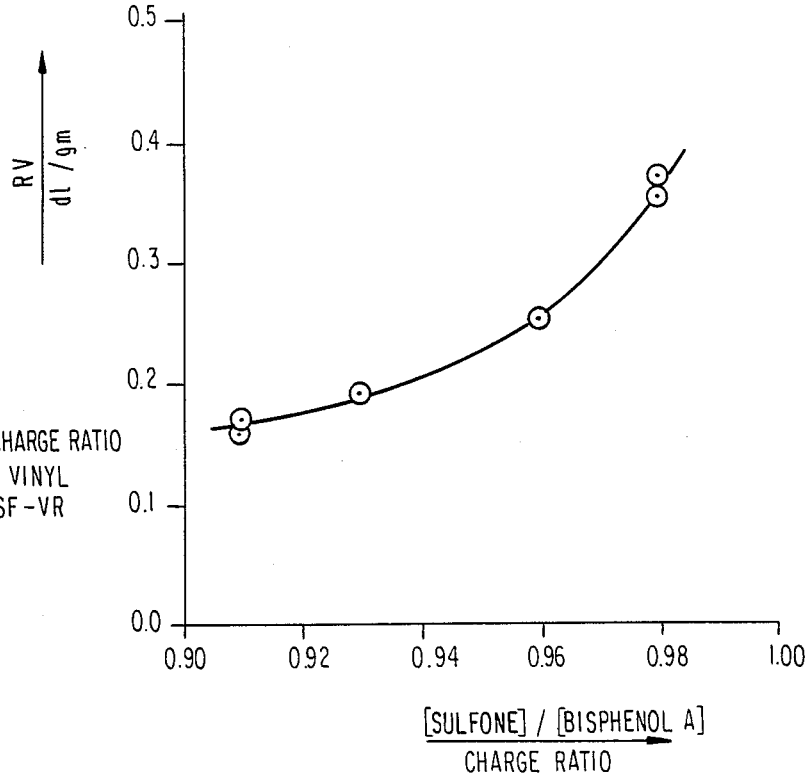
FIG. 3 is a graph of the charge ratio versus the reduced viscosity.

The molecular weights of the polysulfone-vinyl reactive resins are controlled by adjusting the stoichiometry cf mononers in the feed. Using reduced viscosity (R.V.) as a measure of the molecular weight, the sulfone bisphenol-A molar ratios used in the feed are plotted against the deduced viscosity values of a series of vinyl benzyloxy end-capping polysulfone-vinyl reactive resins in FIG. 3. The other polysulfone-vinyl reactive resins (not shown in FIG. 3) follow roughly the same relationship.

Polysulfone-vinyl reactive resins are compositionally identical to the polysulfone-silane reactive resins except the end-groups. Consequently, the physical properties of the two types of resins are quite similar even though they cure by two distinctively different mechanisms. A comparison of the properties of these two resins is illustrated in Table I below.

TABLE I

A COMPARISON BETWEEN PSF-VR[a] AND PSF-SR[b] RESINS

| Property | PSF-VR[a] | PSF-SR[b] |
|---|---|---|
| Appearance | White Fluff | Same |
| Solubility | Soluble in chlorinated hydrocarbons, THF, Dioxane, DMSO, DMF, etc. | Same |
| Tg (uncured) | Increases with increasing $\overline{M}n$ | Same |
| Tg (cured) | Equivalent to that of standard polysulfone | Same |
| Thermal Stability | Will advance gradually above Tg[c] | Same |
| Hydrolytic Stability | Good either in bulk or in solution | Good in bulk |

TABLE I-continued

A COMPARISON BETWEEN PSF-VR[a] AND PSF-SR[b] RESINS

| Property | PSF-VR[a] | PSF-SR[b] |
|---|---|---|
| Curing Reaction | Addition Polymerization | Condensation Polymerization |
| Curing Method | Peroxide, radiation (UV Electron Beam, etc.) | Heat and moisture |
| By-product evolved during | None[d] | Methanol and water |
| Adhesive Capability | None | Excellent |

Notes:
[a]Polysulfone-vinyl reactive.
[b]Polysulfone-silane reactive.
[c]Depending on the reactivity of the end groups.
[d]Not counting the decomposition products from the peroxide if used.

The thermal stability of the polysulfone-vinyl reactive resins apparently is much influenced by the nature of the end groups. Resins end-capped with the methacryloxy ethoxy groups were found to retain their thermoplasticity upon repeated thermal abuses at elevated temperatures, while those having the vinyl benzyloxy end groups would advance under similar conditions. This difference in behavior is consistent in the fact that, while the methacrylates are known to be fairly stable (thermally) in the absence of an initiator, the styrene monomers will undergo thermal-initiated polymerization—see W. R. Sorenson and T. W. Campbell, "Preparative Methods of Polymer Chemistry", 2nd Edition, Interscience (1968), pp. 210 and 253.

The polysulfone-vinyl reactive resins are not subject to hydrolysis under normal conditions. They are therefore more tolerant of water or alkaline contaminates than the polysulfone-silane reactive resins.

The polysulfone-vinyl reactive resins share the common unique feature with the polysulfone-silane reactive resins in exhibiting excellent stability at ambient temperatures. This phenomenon has been attributed to the high glass transition temperature of the polysulfone backbone which severely restricts the mobility of the end groups. Curing of the polysulfone-vinyl reactive resins is effected, however, by heating above the glass transition temperature of polysulfone, usually in the presence of a free radical initiator.

The preferred free radical initiators are the peroxides, and the preferred peroxide is dicumyl peroxide. Examples of useful peroxides are the dialkyl peroxides, such as, di-t-butyl peroxide, lauroyl peroxide, decanoyl peroxide, 2-methylpentanoyl peroxide, acetyl peroxide, 2,5-dimethyl-2,5-di (t-butylperoxy-hexane and 2,5-dimethyl-2,5-di(t-butylperoxy)hexyne-3, the diaryl peroxides, such as, benzoyl peroxide, the alkaryl peroxides, such as, dicumyl peroxide, the sulfonyl peroxides, such as acetyl cyclohexysulfonyl peroxide and acetyl sec-heptylsulfonyl peroxide, the peresters, such as, t-butyl perbenzoate, t-butyl peroxyneodecanoate, t-butyl peroxypivalate, 1,1,3,3-tetramethylbutyl peroxy-2-ethylhexanoate, 2,5-dimethyl-2,5-bis(2-ethylhexanoylperoxy)hexane, t-butyl peroxy-2-ethylhexanoate, t-butyl peroxyisobutyrate, t-butyl peroxymaleic acid, 00-t-butyl 0-isopropyl monoperoxycarbonate, 2,5-dimethyl-2,5-bis-(benzoylperoxy)hexane, t-butyl peracetate and di-t-butyl diperoxyphthalate, the peroxydicarbonates, such as, di(isopropyl) peroxydicarbonate, di-isopropyl peroxydicarbonate, di(secbutyl) peroxydicarbonate, di(2-ethylhexyl) peroxydicarbonate, dicyclohexyl peroxydicarbonate and dibenyl peroxydicarbonate. The organometallic peroxides, such as, vinyl tris(t-butyl peroxy)silane, the hydroperoxides, such as, t-butyl hydroperoxide and cumyl hydroperoxide, 1,1,3,3-tetramethylbutyl hydroperoxide and 2,5-dihydroperoxy-2,5-dimethylhexane, the azo compounds, such as, 2,2'-azobis(isobutyronitrile) and 2,2'-azobis(2,4-dimethylvaleronitrile).

The reactivity of a polysulfone-vinyl reactive resin will vary greatly, depending on the type of end groups employed. Those having alloxy or vinyl ether ethoxy end groups react with difficulty, those terminated with either methacryloxy ethoxy or acryloxy ethoxy end groups are reactive but the presence of an initiator is usually necessary, and those with vinyl benzyloxy end groups will react upon thermal initation.

A neat (pure) polysulfone-vinyl reactive resin, even with the reactive vinyl benzyloxy and groups, requires prolonged heating at temperatures above the glass transitional temperature of polysulfone to reach a high degree of cross-linking. The cure rate can be accelerated by the addition of a peroxide. This approach, however, is often hampered by the lack of a suitable peroxide which will endure the high process temperature necessary for these resins. At ambient temperatures, a neat polysulfone-vinyl reactive resin is not curable by either electron beam or U. V. radiation due to a restricted molecular mobility.

An important finding in the curing behavior of the polysulfone-vinyl reactive (PSF-VR) resins is that they are soluble in styrene monomer over the entire compositional range, and that the resultant polymer/comonomer binder system will polymerize and yield a true copolymer. The latter may be either a thermoset or thermoplastic depending on the polysulfone-vinyl reactive/styrene feed ratio, and the method of polymerization. Bulk polymerization usually leads to cross-linked products while solution polymerization at low polysulfone-vinyl reactive concentrations often produces soluble copolymers. A polysulfone-vinyl reactive resin/styrene binder system is not only peroxide curable, it also can be cured by exposure to electron beahm or U. V. radiation in the presence of a photo-sensitizer. In the latter cases, styrene also acts as a diluent for the polysulfone-vinyl reactive resin to provide the necessary mobility at ambient temperatures.

In addition to styrene, polysulfone-vinyl reactive resins can be mixed and cured with a variety of other comonomers to produce copolymers having a broad range of thermal and mechanical properties. This approach not only permits the use of polysulfone-vinyl reactive resins for various polymer modification purposes but also provides an attractive may of reducing the cost of the resin through compounding with cheaper comonomers. Through the selection of comonomers and their loadings, it is often feasible to tailor-make formulations to fulfill the cost/performance requirements of different end-uses. Commercial comonomers which are suited for the above purpose include styrene, α-methyl styrene, divinyl benzene, acrylates, methacrylates, acrylonitrile, dialkylphthalates, trimethylolpropanetrimethacrylate, triallylcyanurate, α-methacryloylpropyltrimethoxysilane and diacetone acrylamide. By employing polysulfone-vinyl reactive resins of various initial molecular weights, polysulfone-vinyl reactive resin/comonomer binder systems having different cross-linking densities as well as polysulfone block lengths can be prepared.

The use of a comonomer in conjunction with the polysulfone-vinyl reactive resin offers a number of advantages: (a) the formulation is rendered curable by conventional methods; (b) property modifications are permitted through a wide selection of comonomers; and (c) flexibility is allowed in meeting the cost/performance requirements for different end-use areas. Upon cross-linking, polysulfone-vinyl reactive resins exhibit a marked improvement in environmental stress-crack resistance over the regular polysulfone, similar to that of the polysulfone-silane reactive resins. The degree of improvement is usually parallel to the increase in cross-linking density of the cured material.

Because of the dual functionalities present in each polysulfone-vinyl reactive molecule, polymerization usually leads to the formation of a network structure. However, under certain circumstances the polysulfone-vinyl reactive chains can be extended with another comonomer while retaining its thermoplasticity. These thermoplastic resins can be compression-molded to clear or slightly hazy plaques; they are usually brittle and resemble polystyrene.

Polysulfone has exceptional chemical resistance, particularly in a strong alkaline environment. This quality makes the polysulfone-vinyl reactive resin a suitable matrix resin for fabricating corrosion-resistant composite materials. Polysulfone-vinyl reactive resins, while retaining most of the polysulfone's properties, exhibit a number of additional features which are highly desirable for the coating applications. Because of their oligomeric nature, they are characterized by high solubilities in polysulfone-soluble solvents, low melting points and good melt flow characteristics which make them suitable for a variety of fabrication processes, particularly the solution and power coating techniques. The reactive end-groups of the polysulfone-vinyl reactive resins permit curing by either heat, peroxide, U.V., electon-beam radiation or other suitable energy sources. Once cured, the coating is transformed to a clear, rigid, tough thermoset possessing excellent solvent, chemical and thermal resistance. In contrast to the silane end-capped counterparts, polysulfone-vinyl reactive resins lack inherent bonding capabilities. Better adhesion, however, can be achieved by modifying with say unsaturated silane or silyl peroxide adhesion promoters or suitable polar comonomers. The polysulfone-vinyl reactive resins can be for a variety of coating applications including magnet wire coatings, photocurable coatings and and powder coatings.

Due to their reactive end-groups, polysulfone-vinyl reactive resins can be modified to acquire improved properties over the parent polysulfone. This is exemplified by the broad spectrum of polysulfone-vinyl reactive comonomer binder systems shown in Tables VI to X below. The thermoplastic versions of the polysulfone-vinyl reactive resins are useful, for instance, to bring out compatibility between polysulfone and inexpensive polystyrene.

The polysulfone-vinyl reactive resins are also useful as modifiers for other (reactive) polymers to impart certain desirable polysulfone properties. The resulting compositions can be either copolymers or interpenetrating polymeric networks (IPN's). In addition, the polysulfone-vinyl reactive resins can be used for formulating photocurable printing plates and for making membranes to take advantage of their mechanical rigidity, and chemical resistance; porosity in the membrane can be readily developed by solvent leaching upon curing.

The polysulfone-vinyl reactive/comonomer binder system of the invention is often a cross-linked copolymer produced by chain extension with a suitable comonomer from the reactive end-groups of the polysulfone-vinyl reactive resin. So the polysulfone-vinyl reactive/-comonomer binder systems should be handled like a thermoset. This behavior undoubtedly restricts its melt processability, but it also provides several useful properties being a thermoset. The broad spectrum of comonomers available provide a great deal of freedom to the formulation of such binder systems. Styrene, acrylonitrile and divinyl benzene are among the preferred comonomers for this purpose.

Vinylbenzylchloride is the preferred end-capping compound because of its commercial availability, attractive economy and good reactivity. A drawback of this reagent is that polysulfone-vinyl reactive resins having the vinyl benzyloxy end-groups are subject to thermal-initiated polymerization. This behavior complicates the melt recovery process employed for the standard polysulfone as well as limits the operating altitude during melt fabrications. This difficulty can be resolvable by the addition of a suitable inhibitor.

End-capping of 5,000 molecular weight, hydroxy terminated polysulfone oligomer with vinylbenzyl chloride afforded a thermosetting composition with excellent solvent resistance. At 200 psi, this material did not rupture after twenty-five minutes of exposure of acetone, toluene, and trichloroethylene. Although compression molded plaques were brittle the high cure speed and good flow behavior should make this material of interest in coating applications (e.g., powder coating).

The properties of the thermosetting polysulfone-vinyl reactive resin and their blends with some epoxy resins are listed in Table A below: The 5,000 MW polysulfone-vinyl reactive resin/epoxy system exhibited excellent flow characteristics, solvent resistance, a high glass transition temperature (Tg) and good tensile properties.

The environmental stress aging characteristics of vinylbenzyl chloride capped polysulfone resins are listed in Table B below:

TABLE A

| COMPOSITE | Tg, °C. | TENSILE STRENGTH, PSI | ELONGATION @ BREAK, % |
|---|---|---|---|
| 5,000 MW polysulfone-vinyl reactive resin/ ERRE-0100 | 160° | 12,000 | 5 |
| 10,000 MW polysulfon-vinyl reactive resin/ ERRE-0100 | 166° | 13,300 | 5 |
| Vinylbenzylchloride capped 5,000 MW polysulfone-vinyl reactive resin | 166° | 3,040 | 1.2 |
| Vinylbenzylchloride Capped 10,000 MW polysulfone-vinyl reactive resin | — | 11,000 | 6 |

TABLE B

| ENVIRONMENTAL STRESS AGING CHARACTERISTICS | | | | |
|---|---|---|---|---|
| | | TIME TO FAILURE | | |
| | STRESS LEVEL | ACETONE | TRICHLORO-ETHYLENE | TOLUENE |
| Vinylbenzylchloride Capped 5,000 MW PSF | 200 psi | >25 min. | >25 min. | >25 min. |
| Vinylbenzylchloride Capped 10,000 MW PSF | 200 psi | inst. | 480 sec. | inst. |

The comonomer having at least one monovalent unsaturated organo radical should be one which is not gaseous at ambient conditions. Such comonomer preferably also is compatible with the polysulfone-vinyl reactive monomer. The term compatibility, as used herein, means that such comonomer has a reasonable degree of solubility in the polysulfone-vinyl reactive. For example, styrene is completely soluble in the polysulfone-vinyl reactive monomers, so styrene is very compatible with the polysulfone vinyl reactive monomers. Acrylates have some solubility in the polysulfone-vinyl reactive monomers, so acrylates have some compatibility with the polysulfone-vinyl reactive monomers. Acrylonitriles also have a good degree of compatibility.

As used herein, the term "vinyl monomer" broadly means a monomer containing at least one of the groups vinyl, vinylidene or vinylene. Vinyl is $H_2C{=}CH{-}$; vinylidene is $H_2C{=}C{=}$; and vinylene is $-CH{=}CH-$. Each of such terms includes substituted groups. (Broadly monomers having at least one monovalent reactive unsaturated organo moiety are used as the comonomers.)

Preferably the monovinyl monomer is a vinyl monomer having the formula:

$$H_2C{=}CH{-}R$$

wherein R is a hydrogen atom, an alkyl group having from 1 to 4 carbon atoms, an alkoxy group having from 1 to 4 carbon atoms, an alkylcarboxyl group having from 2 to 12, preferably from 2 to 10 carbon atoms, a nitrile group, a halogen atom, preferably a chlorine atom, a phenyl group, or an alkoxycarbonyl group having from 2 to 12, preferably from 2 to 9 carbon atoms. A single vinyl monomer as well as mixtures of vinyl monomers can be used.

The compatible monovinyl monomers include: styrene; α-substituted styrenes, i.e.

$$C_6H_5\underset{\underset{R_2}{|}}{C}{=}CH_2,$$

wherein $R_2$ is alkyl and/or alkoxy having 1 to 6 carbon atoms; substituted styrene, i.e., $R_nC_6H_{5-n}CH{=}CH_2$, wherein n is 1 to 5, R is chlorine, fluorine, bromine, iodine, alkyl having 1 to 6 carbom atoms, alkoxy having 1 to 6 carbon, —CN or $-NO_2$; alkylacrylates wherein the alkyl has 1 to 11 carbons, preferably 1 to 6 carbons; alkoxyacrylates, wherein the alkyl has 1 to 11 carbons, preferably 1 to 6 carbons; alkyl methacrylates, wherein the alkyl has 1 to 10 carbons, preferably 1 to 6 carbons; alkoxy methacrylates, wherein the alkyl has 1 to 10 carbons, preferably 1 to 6 carbons; allyl alkyl ethers, i.e., $CH_2{=}CHCH_2OR$, wherein R is alkyl having 1 to 6 carbons and allyl halides, i.e., $CH_2{=}CHCH_2X$, wherein X is chlorine, fluorine, bromine or iodine.

Examples of useful monovinyl monomers include: vinyl esters of aliphatic monocarboxylic acids, such as, vinyl acetate, vinyl propionate, vinyl laurate, vinyl decanates, vinyl butyrate, vinyl isobutyrate, vinyl dimethylpropionate, vinyl ethylbutyrate, vinyl valerate, vinyl caproate, vinyl methoxyacetate, vinyl butoxyacetate, vinyl phenylacetate, vinyl acetoacetate, vinyl lactate, vinyl β-phenylbutyrate, vinyl cyclohexylcarboxylate, vinyl benzoate, vinyl salicylate, and vinyl naphthoate; vinyl ethers, such as, n-butyl vinyl ether, isobutyl vinyl ether, vinyl propyl ether, vinyl 2-ethylhexyl ether, methyl vinyl ether, butyl vinyl ether, hexyl vinyl ether, octyl vinyl ether, decyl vinyl ether, ethylhexyl vinyl ether, methoxyethyl vinyl ether, ethoxyethyl vinyl ether, 1-methyl-2,2-dimethylpropyl vinyl ether, 2-ethylbutyl vinyl ether; vinyl alkoxyalkyl ethers; vinyl haloalkyl ethers; vinyl ketones, such as methyl vinyl ketone, phenyl vinyl ketone and methoxyethyl vinyl ketone; α-olefins or 1-olefins, such as, ethylene, isobutylene, propylene, 1-butene, 1-pentene, 1-hexene, 4-methyl-1-pentene, 1-heptene, 1-octene, 1-decene, 5-methyl-1-nonene, 5,5-dimethyl-1-octene, 4-methyl-1-hexene, 4,4-dimethyl-1-pentene, 5-methyl-1-hexene, 4-methyl-1-heptene, 5-methyl-1-heptene, 4,4-dimethyl-1-hexene, 5,6,6-trimethyl-1-heptene, 1-dodecene and 1-octadecene; styrene; styrene derivatives, such as α-propylstyrene, α-ethylstyrene, α-methyl styrene, 2-chlorostyrene, 3-chlorostyrene, 4-chlorostyrene, 2-bromostyrene, 3-bromostyrene, 4-bromostyrene, 2-fluorostyrene, 3-fluorostyrene, 4-fluorostyrene, 4-nitrostyrene, 2-methoxystyrene, 3-methoxystyrene, 4-methoxystyrene, o-methylstyrene (o-vinyl toluene), m-methylstyrene, p-methylstyrene, 2,5-difluorostyrene, 2,5-dichlorostyrene, 2,4-dimethylstyrene, 2,5-dimethylstyrene, 2,4,6-trimethylstyrene, 4-methoxy-3-methylstyrene, 4-fluoro-3-trifluoromethylstyrene, 2-bromo-4-trifluoromethylstyrene, trifluorostyrene, dibromostyrene, iodostyrene, trimethylstyrene, ethylstyrene, diethylstyrene, isopropylstyrene, butylstyrene, hexylstyrene, cyclohexylstyrene, decylstyrene, benzylstyrene, chloromethylstyrene, trifluoromethylstyrene and ethoxymethylstyrene, allyl monomers, such as, allyl chloride, allyl bromide, allyl ethyl ether ($CH_2{=}CHCH_2OC_2H_5$), allyl acrylate, allyl cyanide, allyl acetate, allyl benzoate, allyl butyl ether, allyl phenyl ether, allyl lactate, allyl acetoacetate, allyl stearate, allyl palmitate, and allyl laurate; allylbenzene; and allylbenzene derivatives, such as, 1-allyl-4-bromobenzene, and 1-allyl-3,4-dimethyoxybenzene.

Examples of further useful monovinyl monomers include: acrylic acid esters of monohydric alkanols, such as, methyl acrylate, ethyl acrylate, n-butyl acrylate, 2-ethylhexyl acrylate, isobutyl acrylate, n-propyl acrylate, isopropyl acrylate, n-butyl acrylate, sec-butyl acrylate, amyl acrylate, hexyl acrylate, octyl acrylate, tert-octyl acrylate, 2-phenoxyethyl acrylate, 2-chloroethyl acrylate, 2-bromoethyl acrylate, 4-chlorobutyl acrylate, cyanoetbyl acrylate, 2-nitroethyl acrylate, benzyl acrylate, methoxybenzyl acrylate, 2-chloro cyclohexyl acrylate, cyclohexyl acrylate, 2-methoxyethyl acrylate, 3-methoxybutyl acrylate, 2-ethoxyethyl acrylate, 2-isopropoxyethyl acrylate, 2-butoethyl acrylate, 2-(2-methoxyethoxy)ethyl acrylate and 2-(2-butoxyethoxy)ethyl acrylate; methylacrylic acid esters of monohydric alkanols, such as, methyl methcarylate, ethyl methacrylate, 2-ethylhexyl methacrylate, cyclohexyl methacrylate, phenyl methacrylate, methyl α-chloroacrylate, n-propyl methacrylate, isopropyl methacrylate, n-butyl methacrylate, isobutyl methacrylate, secbutyl methacrylate, amyl methacrylate, hexyl methacrylate, cyclohexyl methacrylate, benzylmethacrylate, chlorobenzyl methacrylate, octyl methacrylate, N-ethyl-N-phenylaminoethyl methacrylate, 2-(3-phenylpropyloxy)ethyl methacrylate, 2-methoxyethyl methacrylate, 3-methoxybutyl methacrylate, 2-propoxyethyl methacrylate, 2-ethoxyethyl methacrylate, 2-isopropoxyethyl methacrylate, 2-butoxyethyl methacrylate, 2-(2-methoxyethoxy)ethyl methacrylate, 2-(2-ethoxyethoxy)ethyl methacrylate and 2-(2-butoxyethoxy)ethyl methacrylate; unsaturated nitriles, such as acrylonitrile ($CH_2{=}CHCN$), and methacrylonitrile; and heterocyclic vinyl monomers, such as, N-vinyl pyrrolidone, N-vinyl carbazole, 2-vinyl-5-ethylpyridine, vinylpyridine (2, 3 or 4), vinylpicoline, N-vinyltriazole, N-vinyl-3,5-dimethylpyrazole, N-vinylcarbazole, vinylthiophene, N-vinylpyrrolidone, N-vinylpiperidone, N-vinyl-δ-caprolactam and N-vinyl-2-pyridine.

The compatible divinyl monomers include conjugated dienes and substituted divinyl acryl monomers (preferably p-divinyl-benzene) and diallyl monomers.

Examples of useful divinyl monomers include: o-, m- and p-divinylbenzene; divinyl ether or divinyl oxide [$(CH_2{=}CH)_2O$], 3,9-divinylspirobi-meta-dioxane, divinyl sulfone ($CH_2{=}CHSO_2CH{=}CH_2$); dienes or conjugated diolefins, such as, propadiene, 1,3-butadiene, 1,3-pentadiene (cis and trans), 1,5-hexadiene, 2-methyl-1,3-butadiene (isoprene), and 2,3-methylbutadiene; dicyclopentadiene; 2-chloro-1-3-butadiene; and diallyl monomers, such as, diallyl fumarate, diallyl maleate, diallyl phthalate, diallyl isophthalate, diallyl digylcollate, diallyl chlorendate, diallyl adipate and diallyl ether.

Comonomers having three vinyl or allyl reactive moieties, such as triallyl cyanurate, are particularly useful in the crosslinking version of the invention. Such comonomers can be termed crosslinking boosters, as they speed up the crosslinking and give better results, but as they are usually expensive, cheaper difunctional comonomers are used as the main crosslinkers.

The vinyl reactive moieties of the end-capped polyarylene polyether and the vinyl reactive moieties of the comonomers can be substituted, but the substituents (e.g., Cl) must not be directly on either of the double bond carbon atoms of the vinyl group (i.e., monovalent unsaturated organo group) unless the substituent is alkyl or alkoxy.

Commonly used additives can be used in the homopolymerization and copolymerization. Wetting and dispersing agents and thickening agents (e.g., carboxymethyl cellulose) can be added. Plasticizers (e.g., dibutyl phthalate) can also be added. The amounts added will vary upon the desired results, but preferably each additive is used in the range of about 0.1 to 10 percent by weight.

Polymerization (homo- or co-) can be achieved by the use of free radical initiators, with or without the aid of heat, or by the use of actinic radiation, such as, ultraviolet radiation. Preferably the free radical initiator is a peroxide, and the preferred peroxide is dicumyl peroxide. The polymerization temperature effectively is between 25° (ambient temperature) and 300° C. and preferably is between 100° and 250° C.

The co- or homopolymerization can be effected using slurry suspension or emulsion type polymerization (with conventional aqueous and non-aqueous solvents and liquid carriers).

By way of summary, the invention includes oligomers curable by the free radical mechanism. This is realized by terminating, for example, the polysulfone chains with reactive unsaturated end-groups. The polysulfone-vinyl reactive resins resemble the silane-reactive counterparts in many physical and mechanical properties, but they do not, however, possess adhesive property. The polysulfone-vinyl reactive resins are soluble in styrene, and will copolymerize to give a copolymer (usually thermoset) intermediate in Tg. Such polysulfone-vinyl reactive resin comonomer binder system greatly expands the flexibility in meeting the cost/performance requirements for different potential end-uses. The polysulfone-vinyl reactive resins uses include corrosion-resistance maxtrix resins or additives, photocurable coatings, powder coatings, magnet wire coatings, polysulfone modifications and fiber reinforced structural composites. The data, advantages, methods, etc., concerning the polysulfone-vinyl reactive resins of the invention set out herein is equally applicable to the generic end-capped polyarylene polyether resins of the invention.

The following examples are ilustrative of the invention. As used herein, all parts, percentages, ratio and proportions are on a weight basis unless otherwise stated herein or obvious herefrom to one ordinarily skilled in the art.

Reagents

The following is information on some of the reagents used in the following examples:

| | |
|---|---|
| Bisphenol A | Union Carbide Corp., bisphenol A, 99.71 percent purity. Used without further purification. |
| Sulfone Monomer | ICI sulfone monomer, 100 percent purity assumed. |
| Vinyl benzyl chloride | Dow NC-1915, 98 plus percent purity, 40 percent para-/60 percent meta-isomer ratio. |
| 2-chloroethyl acrylate | Haven Chemical, 95 plus percent purity, inhibited with 0.5 percent of hydroquinone. |
| 2-chloroethyl methacrylate | same as immediately above. |
| 2-chloroethyl vinyl ether | Polysciences, P. p. 109°-110° C. |

-continued

| | |
|---|---|
| Allyl Chloride | Matheson Coleman and Bell B.p. 45°–46° C. |
| Methacryloyl Chloride | Polysciences, B.p. 95°–96° C. |
| Dimethyl Sulfoxide (DMSO) | Matheson Coleman and Bell. |
| Monochlorobenzene (MCB) | Matheson Coleman and Bell. |
| Sodium Hydroxide | Mallinckrokt Chemical Works, 98.5 percent purity. |
| Lupersol-130 | 2,5-dimethyl-2,5-di(t-butyl peroxy) hexyne-3. |
| Atlac 382-05A | Commercial chemical-resistant corrosion-resistant grade of polyester (thermosetting), ICI, Wilmington, Del. |
| Stypol-2995 | Commercial polyester resin, Freeman Chemical Corp., Port Washington, Wisc. |
| UDEL ® Polysulfone | Commercial tough, rigid, high-strength, thermoplastic polysulfone end-terminated with methoxy moieties, Union Carbide, New York, New York. Polysulfone P-1700 is one of a line of UDEL ® polysulfones commercially available from Union Carbide. Polysulfone P-1700 is composed of the recurring units of formula I above (see page 5) with methoxy end-capping moieties. |

Analytical Methods

Determination of Amount of End-Capping Agent Needed

The amount of end-capping reagent needed, on a 20 percent excess basis, can be calculated from the following equation:

End-Capping Reagent (in gm) =

$$\frac{1.20 \times M \times N_{HCl} \times V_{HCl} \times W_t}{1{,}000 \times W_x \times P_x}$$

wherein

M=molecular weight of end-capping reagent,
$N_{HCl}$=normality of HCl/DMSO solution,
$V_{HCl}$=volume of HCl/DMSO used in ml,
$W_t$=total weight of reaction mixture in gm,
$W_s$ =sample weight in gm, and
$P_s$=purity of end-capping reagent.

DMSO is dimethyl sulfoxide.

This information is needed for determining the amount of reagent required for the end-capping reaction. A titration method is used for this purpose.

Upon completion of the polymerization step, a small sample (about 2 to 3 gm) of the reaction mixture is quickly taken from the vessel and placed in a 250 ml Erlenmeyer flask. The sample is weighed and a 50 ml solution of DMSO/MCB (1/1) is introduced (MCB is monochlorobenzene). The sample solution is heated gently on a hot plate until dissolution is complete. A drop of bromocresol purple indicator (0.5 percent in methanol) is added and the sample is titrated with a 0.1N HCL solution (in DMSO) to a yellow end point (pH 5.2 to 6.8). Duplicate tests should be made.

Test For Completion Of The End-Capping Reaction

A 1 to 2 gm sample of the reaction mixture is introduced into a 250 ml Erlenmeyer flask containing a 50 ml solution of DMSO/MCB (1/1). The sample solution is heated on a hot plate until dissolution is complete. Two drops of the bromocresol purple solution are added. The reaction is complete if the indicator turns greenish yellow or yellow. Otherwise, the color will be blue indicating the presence of unreacted phenolate end groups.

Glass Transition Temperature Determination

The glass transition temperature ($T_g$) was measured with a DuPont 990 instrument fitted with pressure DSC cell at a heating rate of 10° C. per minute under a nitrogen pressure of 600 psig. (DCS is Differential Scanning Calorimeter; the procedure for using it is described in A. Duswalt, "Industrial Research," July 1975, pp. 42–45.) Comparable values can also be obtained from the temperature-modulus data measured with an Instron machine at a heating rate of 1.5° C. per minute.

Melting Point Determination

When heated in a capillary melting point apparatus (e.g., a Thomas-Hoover capillary apparatus), phase transition of a polysulfone-vinyl reactive resin can be visually observed. This test is useful for a rapid but rough identification of a polysulfone-vinyl reactive resin.

$\overline{M}n$ Determination

The number average molecular weight ($\overline{M}n$) of the polysulfone-vinyl reactive resins is determined by NMR technique using a Varian 100 MHZ NMR Instrument. Assuming the polysulfone-vinyl reactive resins are completely endcapped, i.e., each molecule is terminated with two unsaturated organo end groups, and there is no hydrolysis of the end groups, they are represented by the following general formula:

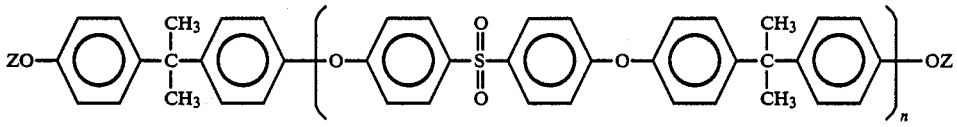

wherein n is the number average degree of polymerization.

PSF-VR/Comonomer Binder System—Peroxide Curing

Compounding—The peroxide, usually DiCup, was dissolved in the liquid comonomer, and was subsequently mixed with the polysulfone-vinyl reactive resin fluff. When the two components were immiscible, a common solvent of low boiling point, such as acetone, was used to give a homogeneous solution before blending with the resin fluff. The solvent was removed by air drying. The latter method usually provides a more uniform mixture, but some comonomer may be lost due to evaporation.

Curing—Unless otherwise specified, all test specimens were cured by compression molding at 160° C. for a ten-minute cycle. These conditions were chosen arbitrarily and may not be optimum for all the binder systems studied.

PSF-VR/Comonomer Binder System—Electron Beam Curing

Sample Preparation—A 4"×4"30 mil plaque was employed for the electron-beam curing. The plaque was prepared by compression molding of a thoroughly blended mixture of the polysulfone-vinyl reactive resin and comonomer. A mild molding temperature, usually around 160° C., was used to prevent premature gellation of the formulation.

Irradiation—A two-million volt van de Graaf electron accelerator was used as the source of electron beam radiation. Different irradiation doses were achieved by varying the exposure time.

PSF-VR/Comonomer Binder System—- Photocuring

Sample Preparation—A formulation, usually containing a polysulfone-vinyl reactive (PSF-VR) resin, a comonomer and a photo-initiator, was thoroughly mixed and was compression-molded to a 10 mil thick film. By using a molding temperature at or below 160° C., the resulting film remained thermoplastic. The film was mounted on an 8"×8"×5 mil aluminum foil to facilitate handling.

U.V. Irradiation—Linde photocuring equipment, having a flux density of 160 watts/ft$^2$, was used as the U.V. source. Different irradiation doses were accomplished by varying the conveyor speed and the number of passes through the irradiation zones.

Gel Content (Or Percent Extractables)

The gel contents of the cured polysulfone-vinyl reactive resin samples were measured by solvent extraction in boiling chloroform. The data of percent extractables shown in Tables XVI and XVIII were determined in methylene chloride. The higher the cross-linking is, the greater the gel content and the lower the percent extractables.

Swelling Index

Swelling index may be related quantitatively to the cross-linking density of a given network structure. The data shown in Table XVII and XVIII were values measured in methylene chloride and calculated according to the following equation:

$$\text{(Corrected) Swelling Index} = \frac{\text{Weight of Swollen Sample}}{\text{Initial Sample Weight} - \text{Weight of Soluble Portion}}$$

Environmental Stress-Crack Resistance

Environmental stress-crack resistance data were measured at constant stress levels using an environment of solvent-saturated cotton swab attached to the specimen. Performance was rated on the basis of time elapsed before rupture at a given stress level.

Solution Polymerization

The desired amounts of polysulfone-vinyl reactive resin and freshly distilled styrene monomer were placed into a pyrex glass ampoule. A solution made of freshly distilled monochlorobenzene and benzoyl peroxide (1.67 mg. benzoyl peroxide/1 ml monochlorobenzene)-was added so that the final solution contained 20 percent of reactants and 0.1 percent of benzoyl peroxide. The ampoule was degassed at liquid nitrogen temperature and was sealed under a nitrogen atmosphere. Polymerization was carried out at 80° C. for a period of 19 hrs. At the end of polymerization, the ampoule was opened and the polymer recovered by coagulation in isopropanol.

Reduced Viscosity Determination

The reduced viscosity (R.V.) is determined by the procedure of ASTM-D-2857 at a concentration of 0.2 grams of the resin in 100 milliliters of solution.

The above information often uses the term polysulfone-vinyl reactive resins but is equally applicable to or encompasses the broader term monovalent, unsaturated organo end-capped polyarylene polyether resins.

EXAMPLE 1

Allyl Terminated Polysulfone Oligomer

To a five-liter four-neck flask was charged 456.56 grams (2.0 mole) of bisphenol A, 1 liter of dimethyl sulfoxide (DMSO), 2 liters of chlorobenzene and 320.0 g (4.0 mole) of 50 percent sodium hydroxide solution. The resulting mixture was heated to reflux and the water dehydrated using the chlorobenzene/water azeotrope with recycle of the chlorobenzene. After complete dehydration, the chlorobenzene was removed until the pot temperature reached 149° C. At this point, 553.5 g (1.93 mole) of 4,4'-dichlorodiphenyl sulfone dissolved in 560 grams of chlorobenzene was added and the reaction allowed to proceed at 137° to 160° C. with removal of the chlorobenzene. Two hours past the addition of the sulfone monomer (the hydroxy terminated polysulfone having been formed), the reaction was cooled to 60 and 40 grams of allyl chloride added. In 5 minutes, an additional 10.0 grams of 50 percent sodium hydroxide solution was charged and then heated to 110° C. for 1 hour. Oxalic acid (10 g) was added to acidify the reaction, 2 liters of chlorobenzene was added to cut the viscosity and the solution was filtered to remove sodium chloride. The filtrate containing the product was washed seven times with 1.4 liters of water to remove the DMSO and the product was then recovered by processing through a vented extruder at 300° C. to afford 620 grams of pelletized, allyl-terminated polysulfone oligomer.

EXAMPLE 2

Thermosetting 5,000 Molecular Weight Vinyl End-Capped Polysulfone

To a 3-liter round bottom flask was added 300 9grams of the hydroxy terminated polysulfone ($\overline{M}n=5,000$), 500 ml of chlorobenzene and 1000 ml of DMSO. The hydroxy terminated polysulfone was prepared from bisphenol A and 4,4'-dichlorodiphenyl sulfone as described in Example 1. To this solution at room temperature was added dropwise 9.7 gms of 49.6 percent sodium hydroxide (0.12 moles). The reaction mixture darkened significantly on addition of caustic. Then 18.96 g (20 percent excess) of vinyl benzyl chloride (commercially available from Dow Chemical) was added dropwise. The solution was stirred at 3 for 3 hours and at 70° C. for 2 hours. The contents were still basic (pH≃8) after setting overnight at room temperature. Oxalic acid was added until a pH of 3 was obtained. Coagulation of 200 ml of the solution in 1500 ml of methanol, and drying overnight in a vacuum oven (60 mm) at 120° C. yielded a vinyl benzyl end-capped polysulfone (5,000 molecular weight). The sample was compression molded at 250° C./10 minutes. The resulting 25 mil plaque had a tensile modulus of 248,000 psi, tensile strength of 3,040 psi, elongation to break is 1.2 percent, and pendulum impact of 2.4 ft. lb./in.$^3$. Environmental stress aging tests at 200 psi indicated that the sample was intact in acetone, toluene and trichloroethylene for over 25 minutes. The material, however, swelled in trichloroethylene.

EXAMPLE 3

Thermosetting 10,000 Molecular Weight Vinyl Benzyl End-Caped Polysulfone

A vinyl benzyl end-capped polysulfone (10,000 molecular weight) was prepared as in Example 2 above, except that in this preparation a hydroxy terminated polysulfone oligomer (10,000 molecular weight) was employed. The hydroxy terminated polysulfone oligomer was prepared from bisphenol A and 4,4'-dichlorodiphenyl sulfone as described in Example 1. The vinyl end-capped polymer was compression molded at 250° C. for 10 minutes. A 15 mil plaque exhibited a tensile modulus of 320,000 psi, a tensile strength of 11,000 psi, an elongation to break of 6 percent and a pendulum impact of 27 ft. lb./in.$^3$. At 200 psi, it took 480 sec. for failure of the sample in trichloroethylene. In acetone and toluene, the failure was instantaneous. A significant resistance to trichloroethylene is useful in some electrical applications.

EXAMPLE 4

Coating Systems Based on Allyl Terminated Polysulfone

Allylic terminated polysulfone prepared as in Example 1 above was dissolved in methylene chloride solvent to provide a 10 percent solids-containing solution. Several steel "D" plates, 10 mils thick, were dip coated in this solution and dried at room temperature for 10 minutes which was followed first by, oven drying at 125° C. for 45 minutes and then by various high temperature oven time bake exposures at 315° to 320° C.

Figure 2:
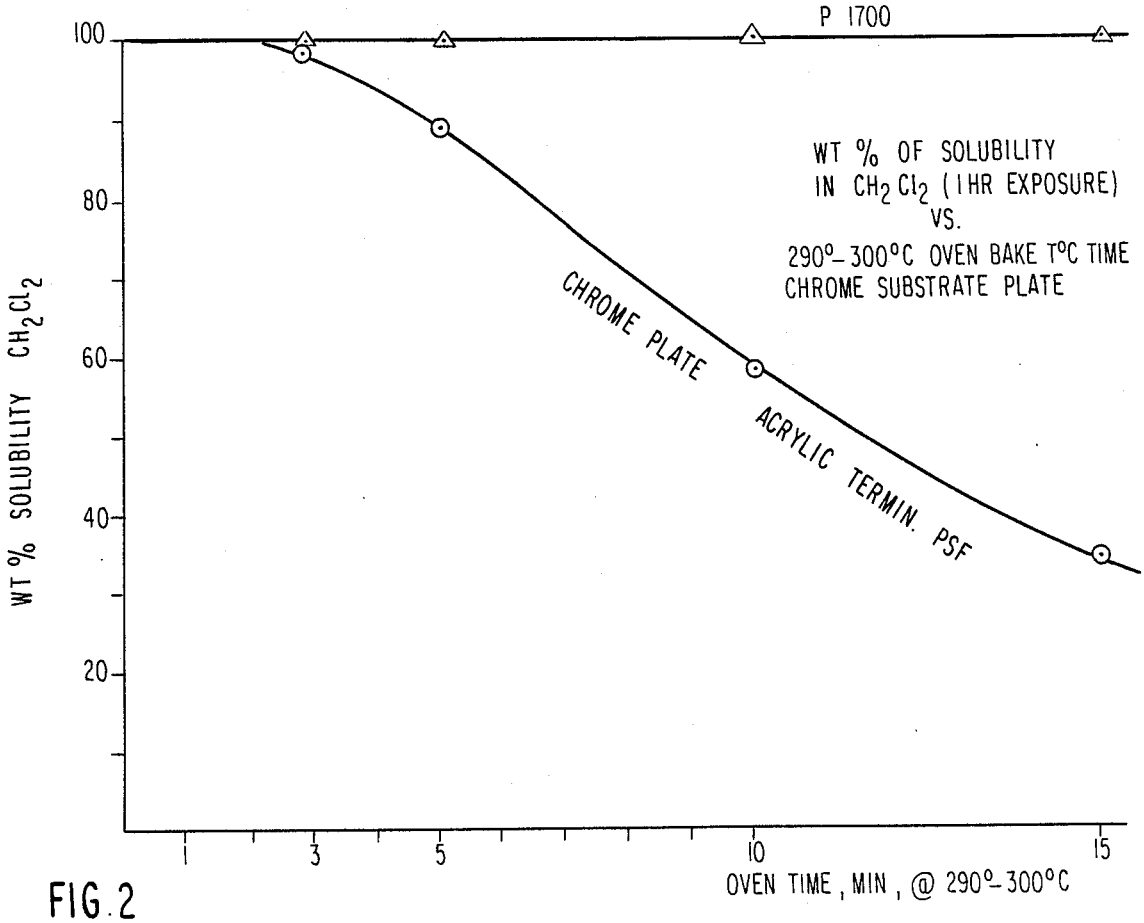
FIG. 2 is a graph of a methylene chloride solubility curve for certain plated substrates.

Upon weighing the residual coating baked onto the steel, the coatings were subjected to $CH_2Cl_2$ extraction by immersion in the stirred solvent bath. The appropriate graph in FIG. 1 illustrates that the degree of solubility to methylene chloride is an inverse function of bake time exposure in an oven at 315° to 320° C. Similar extraction data following the identical procedure outlined above was obtained for glass and chrome substrates coated allylic terminated polysulfone (prepared as in Example 1 above) and for controls which had P-1700 polysulfone coatings. The appropriate graph in FIG. 1 illustrates the methylene chloride solubility curve for the glass-plated substrates; and the graph in FIG. 2 illustrates the methylene chloride solubility curve for the chrome-plated substrates. Steel "D" plates coated with either P-1700 polysulfone coatings or the allyl-terminated polysulfone (prepared as in Example 1) were subjected to acetone and methylene chloride extraction by immersion. The data and results are set out below in Table II:

TABLE II

| SUBSTRATE | POLY-SULFONE TYPE | SOLVENT AND TREATMENT | RESULTS |
|---|---|---|---|
| Steel "D" Plate | P-1700 | Acetone, 1 minute immersion. | Stress cracked coating. |
| | Allyl Terminated | Acetone, 1 minute immersion. | No effect. |
| | P-1700 | Methylene Chloride, 10 minute immersion. | Coating dissolved. |
| | Allyl Terminated | Methylene Chloride, 10 minute immersion. | No effect. |
| | P-1700 | Acetone, 10 minute immersion. | Coating dissolved. |
| | Allyl Terminated | Acetone, 10 minute immersion. | No effect. |

The data of Table II shows that acetone and methylene chloride immersion caused stress cracking or dissolution of the P-1700 polysulfone coatings, but did not have any effect on the allylterminated polysulfone coatings of this invention. Several samples of aluminum sheet (7.5 mils thick, type 3003 H 14) were also coated as described in the procedure above and baked. The coated aluminum plates were subjected to acetone and methylene chloride extraction by immersion, in some cases followed by dipping in hot sodium hydroxide solution. A comparison of the solvent resistance (data and results) of allyl terminated polysulfone and conventional P-1700 polysulfone is set out below in Table III:

TABLE III

| SUB-STRATE[1] | POLY-SULFONE TYPE | SOLVENT AND TREATMENT | RESULTS |
|---|---|---|---|
| Aluminum | P-1700 | 1 minute in Acetone followed by 15 sec. dip in 20% NaOH solution. | Aluminum attacked. |
| | Allyl Terminated | 1 minute in Acetone followed by 15 sec. dip in 20% NaOH solution. | No effect. |
| | P-1700 | 10 minutes in $CH_2Cl_2$ followed by hot NaOH solution. | Coating removed; all metal attacked. |
| | Allyl Terminated | 10 minutes in $CH_2Cl_2$ followed by hot NaOH solution. | No effect. |
| | P-1700 | 10 minute immersion in Acetone. | Stress cracked coating. |
| | Allyl Terminated | 10 minute immersion in Acetone. | No effect. |

Note:
[1]All substrates were given at least one 90° bend in the test coupon prior to solvent resistance testing.

The data of Table III shows that acetone and methylene chloride immersion caused stress cracking or coating removal of the P-1700 polysulfone coatings, but did not have any effect on the allyl-terminated polysulfone coatings of this invention. Dipping in hot sodium hydroxide solution, after the solvent immersion step, had no effect with the allyl-terminated polysulfone coatings but did attach the aluminum substrates associated with the P-1700 polysulfone coatings.

Both the allylic-terminated polysulfone and P-1700 polysulfone coatings released from glass substrates after baking when exposed to hot detergent solutions (80° C.—14 minutes). On one case, the contol P-1700 did not show chlorinated solvent resistance whereas the allyl terminated and baked coating provides solvent resistance (chlorinated and acetone) yet may be readily removed with hot detergent solutions.

EXAMPLE 5

Into a four-necked, two-liter Morton Flask, equipped with a mechanical stirrer, water trap, condenser, thermometer, addition funnel, and argon inlet, there was placed 183.16 gm of bisphenol A (0.8 mole), 550 ml of DMSO and 700 ml of monochlorobenzene (MCB). The slurry was heated to about 80° C. to give a clear solution. An aqueous solution of 64.96 gm of sodium hydroxide (98.5 percent purity, 1.6 mole) in 75 ml of distilled water was introduced. Azeotropic distillation began at 119° C. and was continued until the temperature reached 155° C. in 4 hrs. During this period a total of 792.2 gm of distillate was collected, which contained 135 ml of aqueous layer. The reaction vessel was cooled to 140° C. and a hot solution of 208.86 gm (0.728 mole) of 4,4'-dichlorodiphenylsulfone (sulfone monomer) in 250 ml of monochlorobenzene was introduced rapidly into the reaction vessel. Distillation of monochlorobenzene resumed until the reaction temperature attained 165° C. when in additional 319 gm of monochlorobenzene was distilled off. The polymerization was maintained at this temperature for an additional 90 minutes. Material balance

| Material | Reactor Charge gm | Water-trap Discharge, gm |
|---|---|---|
| Bisphenol A | 183.16 | |
| Sulfone monomer | 208.86 | |
| NaOH solution | 139.96 | (mainly MCB + water) |
| DMSO | 589.60 | |
| MCB | 1,050.70 | |
| Total | 2,172.28 | 1,111.20 |

There was 1,061.08 gm of reaction mixture remaining in the vessel and the polysulfone oligomer concentration was about 38 percent.

Samples were drawn from the reaction vessel for sodium phenolate end-group analysis. The amount of vinyl benzyl chloride required on a 22 percent excess basis was found to be 30.8 gm (0.198 mole).

The reaction mixture was brought to a temperature of 115° C., and a solution of vinyl benzyl chloride (the end-capping reagent) in 30 ml dry monochlorobenzene was introduced. The reaction was kept at this temperature for 90 min. until the bromocresol purple test became yellowish in color. Thereafter, the reaction was stopped, and the reaction mixture was cooled down to room temperature. The hazy, viscous solution was diluted with 600 ml of monochlorobenzene and was filtered to remove the salt. The clear, amber-colored filtrate was poured into a Waring blender containing a large excess amount of isopropanol (or methanol) to coagulate the polysulfone-vinyl reactive PSF-VR resin which was washed twice more with isopropanol, filtered and was dried under vacuum at 75° C. to yield a white, powdery solid.

| | |
|---|---|
| Product recovered | 311 gm (91 percent of theoretical) |
| Reduced viscosity, R.V. (chloroform, 25° C.) | 0.17 |
| Melting point | 160° C. |

EXAMPLE 6

Using the procedures described in Example 5 but with the following starting materials,

| | |
|---|---|
| Bisphenol A | 183.16 gm (0.8 mole) |
| Sulfone monomer (4,4'-dichlorodiphenyl sulfone) | 220.34 gm (0.768 mole) |
| Sodium hydroxide | 64.96 gm (1.6 mole) |
| 2-chloroethyl methacrylate | 11 gm (0.0703 mole, 25 percent excess) |

a white powdery polysulfone-vinyl reactive resin having methacryloxy ethoxy end-groups was prepared.

| | |
|---|---|
| Product recovered | 313 gm (90 percent of theoretical) |
| R.V. (chloroform, 25° C.) | 0.25 |
| Melting point | 180°-183° C. |

EXAMPLE 7

Using the procedures described in Example 5 but with the following starting materials,

| | |
|---|---|
| Bisphenol A | 183.16 gm (0.8 mole) |
| Sulfone monomer (4,4'-dichlorodiphenyl sulfone) | 208.86 gm (0.728 mole) |
| Sodium hydroxide | 64.96 gm (1.6 mole) |
| Allyl chloride | 21.37 gm (0.279 mole, 100 percent excess) |

a white, powdery polysulfone-vinyl reactive resin having alloxy end-groups was obtained.

| | |
|---|---|
| Product recovered | 306 gm (90 percent of theoretical) |
| R.V. (chloroform, 25° C.) | 0.20 |
| Number average molecular weight ($\overline{M}_n$) | 6,540 |
| Melting point | 163–165° C. |

EXAMPLE 8

Using the procedures described in Example 5 but with the following starting materials,

| | |
|---|---|
| Bisphenol A | 183.16 gm (0.8 mole) |
| Sulfone monomer (4,4-'dichlorodiphenyl sulfone) | 220.33 gm (0.768 mole) |
| Sodium hydroxide | 64.96 gm (1.6 mole) |
| 2-chloroethyl acrylate | 8.6 gm (0.0607 mole, 10 percent excess) |

a white, fluffy polysulfone-vinyl reactive resin having acryloxy ethoxy end-groups was prepared.

| | |
|---|---|
| Product recovery | 306 gm (88 percent of theoretical) |
| R.V. (chloroform, 25° C.) | 0.30 |
| Melting point | 170°–190° C. |

EXAMPLE 9

Table IV below sets out several representative polysulfone-vinyl reactive resins of the invention, plus certain information concerning their preparation and some of their properties:

TABLE IV

PREPARATION AND CHARACTERIZATION OF REPRESENTING LABORATORY-PREPARED PSF-VR[a] RESINS

| End-Capping Reagent | Sulfone/Bis A Charge Ratio[d] Mole/Mole | Recovery % | R.V. Chloroform 25° C. | $T_m$[b] °C. | $\overline{M}_n$ |
|---|---|---|---|---|---|
| 2-chloroethylmethacrylate | 0.93 | 88 | 0.22 | 165°–175° | 11,560[c] |
| | 0.93 | 92 | 0.21 | 163°–177° | |
| | 0.944 | 96 | 0.21 | 180°–185° | |
| | 0.944 | 92 | 0.21 | 180°–190° | |
| | 0.96 | 89 | 0.25 | 177°–196° | |
| | 0.96 | 92 | 0.25 | 180°–183° | |
| | 0.98 | 93 | 0.35 | 210°–212° | |
| 2-chloroethylacrylate | 0.93 | 89 | 0.23 | 160°–173° | |
| | 0.96 | 88 | 0.30 | 170°–190° | |
| methacryloyl chloride | 0.93 | 90 | 0.25 | 175°–190° | 10,600 |
| vinyl benzyl chloride | 0.91 | 97 | 0.16 | 159°–160° | |
| | 0.91 | 93 | 0.17 | 158°–162° | |
| | 0.93 | 94 | 0.19 | 172°–174° | |
| | 0.96 | 91 | 0.25 | 178°–182° | |
| vinyl benzyl chloride | 0.96 | 92 | 0.25 | 191°–195° | |
| | 0.98 | 88 | 0.37 | 206°–210° | |
| | 0.98 | 91 | 0.35 | 198°–200° | |
| allyl chloride | 0.91 | 90 | 0.20 | 163°–165° | 6,540 |
| 2-chloroethyl vinylether | 0.91 | 88 | 0.20 | 170°–173° | |

Notes:
[a]Polysulfone-vinyl reactive.
[b]Polymer softens and melts gradually within the temperature range.
[c]Abnormally high value due to incomplete end-capping.
[d]The hydroxy terminated polysulfones which were vinyl end-capped were prepared from bisphenol A and 4,4'-dichlorodiphenyl sulfone as described in Example 1.

The 0.22 RV, 2-chloroethyl methacrylate end-capped polysulfone-vinyl reactive resin shown in Table IV is an example of low end-capping efficiency. Its deficiency is reflected by the higher than expected number average molecular weight ($\overline{M}_n$) value calculated on the assumption of 100 percent end-capping efficiency. Such a resin may contain up to 30 percent of non-curable fraction as evidenced by solvent extraction test. When the above mentioned precautions are observed during the preparation, however, this difficulty may be largely alleviated.

Figure 4:
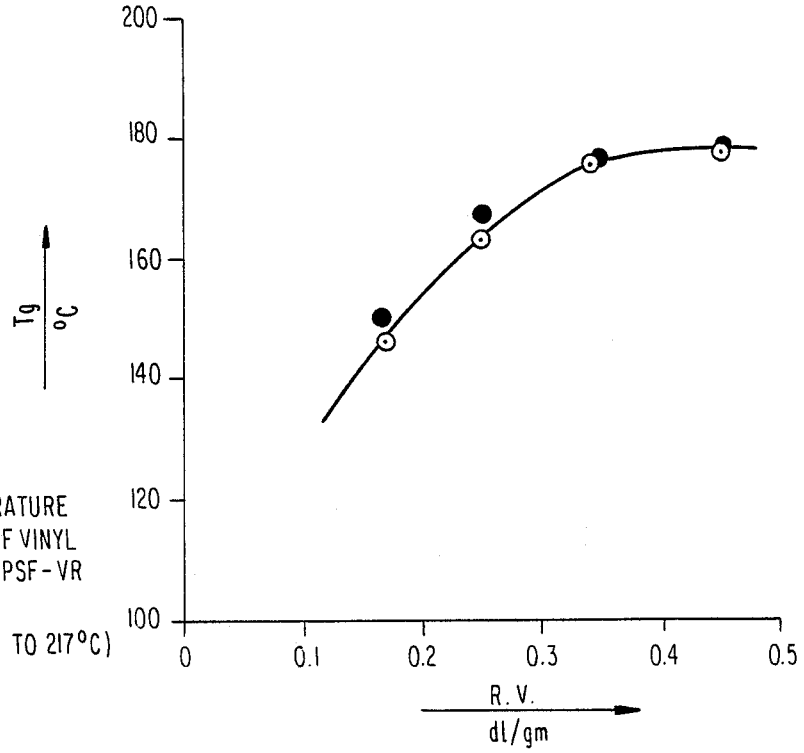
FIG. 4 is a graph of the glass transition temperature versus the reduced viscosity.

It has been found that, analogously to the behavior of polysulfone-silane reactive resins, glass transition temperature (Tg) of a polysulfone-vinyl reactive resin increases with increasing molecular weight and, eventually, approaches that of the standard polysulfone. FIG. 4 shows the above relationship for a series of vinyl benzyloxy end-capped polysulfone-vinyl reactive resins. (The hydroxy terminated polysulfones which were vinyl end-capped were prepared from bisphenol A and 4,4'-dichlorodiphenyl sulfone as described in Example 1.) The hollow circles indicate the Tg values of the virgin samples. In each instance the virgin sample was heated to a temperature of 217° C., cooled, and then measured again to study the effect of thermal history. The second reading was often found to be several degrees higher, which is a sign of resin advancement. Above the Tg, there is a rubbery polymer; below the Tg, there is a glassy polymer.

EXAMPLE 10

Polysulfone-vinyl reactive resins containing (a) vinyl ether ethoxy end-groups, (b) methacryloxy ethoxy end-groups and (c) vinyl benzyloxy end-groups were subjected to thermal abuse at several temperatures. (The hydroxy terminated polysulfones which were vinyl end-capped were prepared from bisphenol A and 4,4'-dichlorodiphenyl sulfone as described in Example 1.) Table V below illustrates the differences in reactivities of such resins.

TABLE V

| EFFECT OF END-GROUP TYPE ON THE REACTIVITY OF POLYSULFONE-VINYL REACTIVE | | | | |
|---|---|---|---|---|
| | Initial | R.V.[a] After 10 min. Heating at (% Gel)[b] | | |
| Type of End-Group | R.V. | 160° C. | 200° C. | 220° C. |
| Vinyl Ether Ethoxy | 0.17 | 0.173 | 0.176 | 0.174 |
| Methacryloxy Ethoxy | 0.193 | 0.197 | 0.206 | 0.207 |
| Vinyl Benzyloxy | 0.172 | (5.1) | (55.1) | (76.2) |

Notes:
[a]Measured in chloroform at 25° C.
[b]Gel content determined by extraction test with boiling chloroform.

EXAMPLE 11

Several typical polysulfone-vinyl reactive resin/-comonomer systems were prepared using heat-peroxide curing. (The hydroxy terminated polysulfones which were vinyl end-capped were prepared from bisphenol A and 4,4'-dichlorodiphenyl sulfone as described in Example 1.) The formulations and curing conditions used in this work for the polysulfone-vinyl reactive comonomer binder systems, as well as the appearance of the system and the stress-crack resistance of the system to acetone, are shown in Table VI below.

TABLE VI

| PEROXIDE (HEAT) CURING OF PSF-VR[a]/COMONOMER BINDER SYSTEMS | | | | | | | |
|---|---|---|---|---|---|---|---|
| PSF-VR[a], End-Gp. Type | Methacryloxy Ethoxy | Methacryloxy Ethoxy | Methacryloxy Ethoxy | Vinyl Benzyloxy | Vinyl Benzyloxy | Vinyl Benzyloxy | Acryloxy Ethoxy |
| R. V. dl/g | 0.35 | 0.25 | 0.25 | 0.25 | 0.25 | 0.25 | 0.23 |
| Comonomer (% By wt) | Styrene (17) | Styrene (17) | Styrene (39) | Styrene (17) | Styrene (17) | Diacetone Acrylamide (20) | Styrene (17) |
| Curing Conditions | 160° C. 15 min. Dicup[b] 1.7% | 160° C. 25 min. Dicup 1.7% | 160° C. 25 min. Dicup 1.7% | 160° C. 25 min. Dicup 1.7% | 160° C. 15 min. Dicup 1.7% | 210° C. 10 min. Lupersol 130, 1% | 160° C. 30 min. t-Butyl perbenzoate |
| Gel Content, % | 73 | 96 | 89 | 95 | 91 | 98 | 75 |
| Appearance | clear, transparent, and tough | clear, transparent, and tough | clear transparent, somewhat brittle | clear, transparent and tough | clear, transparent and tough | yellowish, fairly transparent fairly tough | clear transparent, tough |
| Stress-crack Resistance to Acetone | good | good | fair-good | good | good | good | good |

Notes:
[a]Polysulfone-vinyl reactive
[b]Dicumyl peroxide

EXAMPLE 12

Some of the thermal and mechanical properties of a representative number of polysulfone-vinyl reactive/-comonomer binder systems are set out in Table VII below. (The hydroxy terminated polysulfones which were vinyl end-capped were prepared from bisphenol A and 4,4'-dichlorodiphenyl sulfone as described in Example 1.) All of the copolymer samples, unless otherwise specified, were prepared from a mixture containing 17.4 percent by weight of comonomer and 80.9 percent of polysulfone-vinyl reactive resin. Curing was effected by compression molding at 160° C. in the presence of dicumyl peroxide (1.7 percent).

TABLE VII

| THERMAL AND MECHANICAL PROPERTIES OF REPRESENTING PSF-VR[a]/COMONOMER BINDER SYSTEMS[b] [c] | | | | | | |
|---|---|---|---|---|---|---|
| Comonomer Type | Styrene | a-Methyl Styrene | Methyl Methacrylate | Acrylonitrile | Ethyl Fumarate | Hydroxypropyl Methacrylate |
| PSF-VR[a], End-Gp. Type | Vinyl benzyloxy | Vinyl benzyloxy | Vinyl benzyloxy | Vinyl benzyloxy | Vinyl benzyloxy | Vinyl benzyloxy |
| R.V. dl/gm | 0.17 | 0.17 | 0.17 | 0.17 | 0.16 | 0.16 |
| Color | colorless | colorless | colorless | yellow | colorless | colorless |
| Clarity[d] | transparent | transparent | transparent | transparent | transparent | transparent |
| Tg °C. | 140° | 150° | 160° | 155° | 105° | 130° |
| Modulus at 250° C., psi | 310 | 360 | 310 | 730 | 105 | 400 |
| Tensile Strength, psi | 10,400 | 9,180 | 11,000 | 11,000 | 4,000 | 5,000 |
| Tensile Modulus, psi $\times 10^{-6}$ | 2.99 | 3.29 | 3.25 | 3.14 | 3.23 | 3.00 |
| Elongation at break, % | 8 | 4 | 5.5 | 6 | 1.5 | 2.2 |
| Pendulum Impact, ft-lb/in$^3$ | 34 | 34 | 35 | 25 | 12 | 16 |

| Comonomer Type | 2-chloroethyl Methacrylate | Diacetone Acrylamide | 2-Ethylhexyl Acrylate | Ethyl Acrylate | Vinyl Acetate |
|---|---|---|---|---|---|
| PSF-VR[a], End-Gp. Type | Vinyl benzyloxy | Vinyl benzyloxy | Vinyl benzyloxy | Vinyl benzyloxy | Vinyl benzyloxy |
| R.V. dl/gm | 0.16 | 0.25 | 0.16 | 0.16 | 0.16 |

TABLE VII-continued

THERMAL AND MECHANICAL PROPERTIES OF REPRESENTING PSF-VR[a]/COMONOMER BINDER SYSTEMS[b] [c]

| | | | | | |
|---|---|---|---|---|---|
| Color | | yellow | colorless | colorless | colorless |
| Clarity[d] | | transparent | transparent | transparent | transparent |
| Tg °C. | 120° | 155° | 120° | 130° | 150° |
| Modulus at 250° C., psi | 1,000 | 150 | 300 | 400 | 570 |
| Tensile Strength, psi | 5,640 | 9,950 | 10,300 | 9,000 | 9,620 |
| Tensile Modulus, psi × $10^{-6}$ | 3.13 | 2.60 | 3.26 | 2.78 | 3.06 |
| Elongation at break, % | 2.2 | 8 | 5.5 | 6 | 5 |
| Pendulum Impact, ft-lb/in$^3$ | 7 | 15 | 11 | 30 | 9 |

Notes:
[a]Polysulfone-vinyl reactive
[b]All specimens cured by compression molding at 160° C.
[c]Each formulation contained 17.4 percent of comonomer.
[d]The degree of transparency may vary considerably.

EXAMPLE 13

Some of the thermal and mechanical properties of more polysulfone-vinyl reactive resin/comonomer compositions, but with comonomers containing multiple unsaturation, are set out in Table VIII below. (The hydroxy terminated polysulfones which were vinyl end-capped were prepared from bisphenol A and 4,4'-dichlorodiphenyl sulfone as described in Example 1.) These comonomers, in theory, should result in network structures of much higher crosslinking densities. Even though the polysulfone-vinyl reactive resin exhibited only limited solubility at room temperature in many of the comonomers studied, in most instances the molded plaque possessed a good clarity and a single glass transition temperature characteristic of a copolymer.

Because of questionable compositional uniformity achieved in the preparation of these blends, the true loading of a comonomer in a test specimen may vary significantly from the value indicated. This is thought to be reflected by some erratic glass transitional temperature values. Roughly speaking, however, the glass transitional temperature of the cured compositions varied according to those of homopolymers derived from the corresponding comonomers as well as the comonomer loadings.

Because of their thermoset nature, the cured resins exhibited a markedly improved environmental stress-crack resistance and a better dimensional stability at elevated temperatures than those of the thermoplastic polysulfone.

TABLE VIII

THERMAL AND MECHANICAL PROPERTIES OF REPRESENTATIVE PSF-VR[a]/MULTI-FUNCTIONAL CO-MONOMER BINDER SYSTEMS[b] [c]

| Co-Monomer Type[d] | Divinyl Benzene (17.4)[e] | Divinyl Benzene (17.4) | Diallyl Isophthalate (17.4) | Ethylene Dimethacrylate (17.4) | Trimethylolpropane Trimethacrylate (17.4) | Styrene/Divinyl Benzene (18.5/15.4) | Styrene/Polymeric Booster[f] (14.4/13.4) |
|---|---|---|---|---|---|---|---|
| PSF-VR[a], End-Group Type | Vinyl benzyloxy | Vinyl benzyloxy | Vinyl benzyloxy | Vinyl benzyloxy | Vinyl benzyloxy | Vinyl benzyloxy | Vinyl benzyloxy |
| R.V. dl/gm | 0.17 | 0.17 | 0.17 | 0.16 | 0.16 | 0.17 | 0.17 |
| Color | colorless | colorless | colorless | colorless | colorless | colorless | colorless |
| Clarity[g] | transparent | transparent | transparent | transparent | transparent | transparent | transparent |
| Tg °C. | 170° | 165° | 115° | 148° | 160° | 155° | 165° |
| Modulus at 250° C. | 800 | 450 | 400 | 1,050 | 310 | 1,230 | 380 |
| Tensile Strength, psi | 11,300 | 4,690 | 11,400 | 5,530 | 4,560 | 12,100 | 8,120 |
| Tensile Modulus, psi × $10^{-6}$ | 3.15 | 3.25 | 3.55 | 3.10 | 3.13 | 3.42 | 3.15 |
| Yield Elongation, % | — | — | 5.5 | — | — | — | — |
| Elongation at break, % | 6.0 | 2.5 | 5.8 | 1.9 | 1.7 | 6.5 | 3.5 |
| Pendulum Impact ft-lb/in$^3$ | 44 | 5 | 14 | 20 | 6 | 24 | 28 |

Notes:
[a]Polysulfone-vinyl reactive.
[b]Peroxide cured.
[c]All specimens cured by compression molding at 160° C. unless otherwise specified.
[d]Percent by weight of comonomer added.
[e]Post cured at 200° C. for 10 min.
[f]A polymeric booster containing both pendant and terminal vinyl groups.
[g]The degree of transparency may very considerably.

EXAMPLE 14

By employing polysulfone-vinyl reactive resins of various initial molecular weights, polysulfone-vinyl reactive comononer binder systems having different cross-linking densities as well as polysulfone block lengths can be prepared. The effect on the properties three compositions which are otherwise identical except for the above-mentioned aspects, are set out in Table IX below. (The hydroxy terminated polysulfones which were vinyl end-capped were prepared from bisphenol A and 4,4'-dichlorodiphenyl sulfone as described in Example 1.) The mechanical properties of the cured materials are similar. The environmental stress-crack resistance and residual moduli at 200° C., however, improves with decreasing initial molecular weights of the polysulfone-vinyl reactive resins; which is consistent with the anticipated direction of increasing cross-linking densities. Since the polysulfone-vinyl reactive and the styrene monomer are miscible in all proportions, such a binder system can be a free-flowing powder, a dough, a paste or a solution depending on the relative amount of styrene incorporated. Preliminary data showed that in all instances a copolymer composition was obtained. The glass transitional temperature of the latter went down with increasing amount of polystyrene blocks in the cured resin. The glass transitional temperature values of copolymers at 10, 17.4 and 30 percent polystyrene levels (calculated on the basis of styrene monomer used initially) were found to be 145°, 140°, and 130° C., respectively. Addition of divinyl benzene resulted in a higher Tg with no apparent deleterious effect on the mechanical properties as shown in Table IX below.

TABLE IX

EFFECT OF THE INITIAL MOLECULAR WEIGHT OF PSF-VR[a] TO THE PROPERTIES OF PSF-VR[b]/STYRENE[c] BINDER SYSTEM[d]

| | | | |
|---|---|---|---|
| PSF-VR[a], R.V. dl/gm | 0.17 | 0.25 | 0.37 |
| Tg °C. | 140° | 155° | 145° |
| Modulus at 200° C. | 340 | 200 | 90 |
| Tensile Strength, psi | 10,400 | 10,000 | 10,400 |
| Tensile Modulus $\times 10^{-6}$ psi | 2.99 | 2.84 | 2.76 |
| Yield Elongation, % | — | — | 5.5 |
| Elongation at break, | 8 | 5 | 7 |
| Pendulum Impact, ft-lb/in$^3$ | 34 | 15 | 15 |

Notes:
[a]Polysulfone-vinyl reactive, all have vinyl benzyloxy end groups.
[b]Polysulfone-vinyl reactive.
[c]All formulations contained 17.4 percent by wt. of styrene monomer.
[d]Cured by compression molding at 160° C.

EXAMPLE 15

Because mobility of the backbone is not restricted in a polysulfone-vinyl reactive resin/comonomer binder system at ambient temperatures, it is readily cross-linked by electron-beam irradiation. (The hydroxy terminated polysulfones which were vinyl end-capped were prepared from bisphenol A and 4,4'-dichlorodiphenyl sulfone as described in Example 1.) Properties of some irradiated materials are summarized in Tables X and XI below. Standard polysulfone (Union Carbide Corp., P-1700) was found to undergo no apparent cross-linking, with or without the comonomer additive, under the same conditions. MRAD is a radiation unit or Meg Rad; Rad is 100 ergs per gram.

TABLE X

PSF-VR[a]/COMONOMER BINDER SYSTEMS CURED BY ELECTRON BEAM IRRADIATION

| | | | | |
|---|---|---|---|---|
| PSF-VR[a], R.V. | 0.21 (60)[b] | 0.35 (60) | 0.35 (60) | 0.35 (60) |
| Comonomer[c] | NGD (30)[b] | DB (30) | Styrene (40) | DB (10) |
| | Styrene (10)[b] | Styrene (10) | | Styrene (30) |
| Radiation Dose, MRAD[d] | 20 | 20 | 20 | 20 |
| Gel Content, % | 59 | 57 | 60 | 53 |
| Color | Yellow | Light Yellow | Very Light Yellow | Light Yellow |
| Transparency | Hazy | Slightly Hazy | Clear | Slightly Hazy |
| Mechanical Strength | Rigid, Brittle | Rigid, Fairly Brittle | Rigid, Fairly Tough | Rigid, Fairly Brittle |

Notes:
[a]Polysulfone-vinyl radiation, end-capped with methacryloxy ethoxyl groups.
[b]Percent by weight.
[c]NGD = Neopentyl glycol diacrylate; DB = divinyl benzene.
[d]Unit for radiation dose.

TABLE XI

EFFECT OF RADIATION DOSAGE ON THE CURING OF PSF—VR/COMONOMER BINDER SYSTEM[a]

| | | | | |
|---|---|---|---|---|
| Radiation Dosage, MRad | 5 | 10 | 15 | 20 |
| Gel Content, % | 54 | 65 | 67 | 64 |
| Swelling Index[b] | 3.48 | 2.93 | 2.92 | 3.3 |
| Tg °C. | 145° | 155° | 145° | 150° |
| Modulus at 300° C., psi | 690 | 600 | 670 | 570 |

Notes:
[a]Polysulfone-vinyl reactive, methacryloxy ethoxyl end-groups. 0.35 R.V. Comonomers, Neopentyl glycol diacrylate (30 percent); Styrene (10 percent).
[b]Corrected for extractables.

Within the radiation dosage of 5 to 20 Mrad, there was found no significant difference in cross-linking densities of the irradiated samples. This is supported by experimental data shown in Table XI above, where the cross-linking density is expressed in terms of swelling index and residual modulus at 300° C.

The polysulfone-vinyl reactive bearing the end reactive groups is necessary for cross-linking. Polysulfone alone or with comonomer will not crosslink without the vinyl reactive end groups.

The rather low degrees of cross-linking (up to 70 percent gel content) of the above irradiated samples is believed to be due to at least partially, an incomplete end-capping of the polysulfone-vinyl reactive resins used. Spectroscopic data showed the soluble fraction being entirely polysulfone; no polystyrene was detected.

EXAMPLE 16

When a photosensitizer is added, the polysulfone-vinyl reactive/comonomer binder system becomes photo-curable; even though polysulfone is known to be an U. V. absorbent. A polysulfone-vinyl reactive film containing benzophenone and ethyl acrylate was irradiated with Linde U. V. curing equipment for different intervals, and the results are summarized in Table XII below. (The hydroxy terminated polysulfones which were vinyl end-capped were prepared from bisphenol A and 4,4'-dichlorodiphenyl sulfone as described in Example 1.)

TABLE XII

CURING OF PSF—VR/COMONOMER BINDER SYSTEMS[a] BY U.V. IRRADIATION

| | | | |
|---|---|---|---|
| Irradiation Dosage[b] | 3 | 6 | 12 |
| Gel Content, % | 18 | 27 | 50 |
| Appearance | clear, transparent | clear, transparent | clear, transparent |
| Mechanical Strength | fairly tough | fairly tough | flexible, tough |
| Resistance to Acetone-Induced Stress Crack | poor-fair | fairly good | good |

Notes:
[a]Polysulfone-vinyl reactive, vinyl benzyloxy end groups, 0.37 R.V. (80%); ethyl acrylate (19 percent); benzophenone (1 percent). U.V. catalyst necessary when cured by U.V.
[b]Expressed in number of passes at a conveyor speed of 100 ft/min.

Because of the film thickness (about 10 mil) the degree of cross-linking achieved was relatively low even after twelve passes. The partially cured sample, however, was flexible, tough, and showed a significant improvement in environmental stress crack resistance. Thus the use of a comonomer in conjunction with the polysulfone-vinyl reactive offers a number of advantages: (1) to render the formulation curable by conventional methods; (2) to permit property modifications through a wide selection of comonomers; and (3) to allow flexibility in meeting the cost/performance requirements for different end-use areas.

EXAMPLE 17

Upon cross-linking, polysulfone-vinyl reactive resins exhibit a marked improvement in environmental stress-crack resistance over the regular polysulfone, similar to that of the polysulfone-silane reactive resins. The degree of improvement is usually parallel to the increase in cross-linking density of the cured material. This effect is demonstrated clearly by the data shown in Table XIII below where the environmental stress crack resistance of a series of cured polysulfone-vinyl reactive styrene resins are related to their swelling indices. The cross-linking density is expected to increase with a decrease in the initial molecular weight of the polysulfone-vinyl reactive, which is reflected by a lowering in the swelling index. The environmental stress-crack resistance data was measured at constant stress levels using an environment of solvent-saturated cotton swab attached to the specimen.

Table XIII

ENVIRONMENTAL STRESS CRACK RESISTANCE VS. CROSS-LINKING DENSITY

| | | | |
|---|---|---|---|
| PSF—VR[a], R.V. (82)[b] | 0.17 | 0.25 | 0.37 |
| Comonomer (17)[b] | styrene | styrene | styrene |
| Percent Extractables[c] | 6.11 | 21.68 | 29.97 |
| Swelling Index[d] | 2.64 | 5.77 | 9.25 |
| Time to Rupture: | | | |
| Toluene | | | |
| 1,000 psi | 22 min. | — | 10 sec. |
| 500 psi | — | 150 sec. | 25 sec. |
| Trichloroethylene | | | |
| 1,000 psi | 15 min. | — | — |
| 500 psi | — | 7 min. | 5 min. |
| Acetone | | | |
| 1,000 psi | 25 min. | — | — |
| 500 psi | — | 75 sec. | 20 sec. |

Notes:
[a]Polysulfone-vinyl reactive, having vinyl benzyloxy end groups.
[b]Percent by weight.
[c]Equals 100 minus percent gel.
[d]Corrected for extractables.

EXAMPLE 18

The environmental stress-crack resistance of a cured polysulfone-vinyl reactive comonomer composition also depended on the type and loading of comonomer employed. (The hydroxy terminated polysulfones which were vinyl end-capped were prepared from bisphenol A and 4,4 'dichlorodiphenyl sulfone as described in Example 1.) Table XIV below sets out the environmental stress-crack resistance performance, in decreasing order, of 20 different types of matrices in toluene and trichloroethylene. Three of the more effective comonomers among those studied were divinyl benzene, acrylonitrile and styrene. The neat polysulfone-vinyl reactive resin also performed well upon cross-linking and is comparable to cross-linked polysulfone-silane reactive resin. When styrene was the comonomer used, the resistance of the cured material to solvent-induced stress-crack deteriorated with increasing comonomer loadings.

TABLE XIV

ENVIRONMENTAL STRESS CRACK RESISTANCE VS. COMONOMER TYPE

| Comonomer(s) Type[a] | Percent Extractables | Swelling Index[b] | Toluene Stress (psi) | Toluene Time to Rupture (min) | Trichloroethylene Stress (psi) | Trichloroethylene Time to Rupture (min) |
|---|---|---|---|---|---|---|
| Styrene (18.5) | 3.9 | 1.70 | 2,000 | >60 | 1,000 | 90 |
| Divinyl benzene (15.4) | | | 4,000 | 4 | 4,000 | 7 |
| None[c] | 8.3 | 3.53 | 2,000 | 25 | 2,000 | 80 |
| Divinyl benzene (17.4) | 13.5 | 2.78 | 1,000 | >60 | 2,000 | 10 |
| | | | 2,000 | 18 | | |
| Divinyl benzene[d] (17.4) | 3.5 | 1.96 | 2,000 | 5 | 2,000 | 14 |
| | | | | | 4,000 | 1 |
| Acrylonitrile (17.4) | 3.5 | 2.38 | 1,000 | >90 | 2,000 | 6 |
| | | | 2,000 | 5 | | |
| Ethylene dimethacrylate (17.4) | 4.9 | 1.92 | 1,000 | 30 | 1,000 | 20 |
| Styrene (9) | 5.4 | 2.50 | 1,000 | 23 | 2,000 | 4 |
| | | | 2,000 | 3 | | |
| Styrene (13.4)[e] | 5.3 | 2.72 | 2,000 | 2 | 1,000 | 5 |
| Vinyl acetate (17.4) | 8.2 | 2.73 | 1,000 | 22 | 1,000 | 11 |
| Ethyl acrylate (17.4) | 8.1 | 2.79 | 1,000 | 10 | 1,000 | 16 |
| 2-chloroethyl methacrylate (17.4) | 11.6 | 2.83 | 1,000 | 7 | 1,000 | 5 |
| Methyl methacrylate (17.4) | 8.8 | 3.15 | 1,000 | 5 | 1,000 | 6 |
| 2-Ethyl hexyl acrylate (17.4) | 8.2 | 3.08 | 1,000 | 4½ | 1,000 | 6 |
| 2-methyl Styrene (17.4) | 6.0 | 2.98 | 1,000 | 4 | 1,000 | 6 |
| Diallyl isophthalate (17.4) | 8.2 | 2.54 | 1,000 | 4 | 1,000 | 5 |
| Hydroxy propyl Methacrylate (17.4) | 11.0 | 2.96 | 1,000 | 3½ | 1,000 | 5 |
| Styrene (29.4) | 5.9 | 3.11 | 1,000 | 3 | 1,000 | 3 |
| Ethyl Fumarate (17.4) | 20.4 | 4.20 | 1,000 | 2½ | 1,000 | 2 |
| Trimethylol propane trimethacrylate (17.4) | 8.2 | 2.15 | 1,000 | ½ | 1,000 | 3 |

TABLE XIV-continued

ENVIRONMENTAL STRESS CRACK RESISTANCE VS. COMONOMER TYPE

| Comonomer(s) Type[a] | Percent Extractables | Swelling Index[b] | Toluene Stress (psi) | Toluene Time to Rupture (min) | Trichloroethylene Stress (psi) | Trichloroethylene Time to Rupture (min) |
|---|---|---|---|---|---|---|
| PSF P-1700[f] | Soluble | — | 200 | Instantaneous | 200 | 1/6 |

Notes:
[a]Percent by weight present in the feed before curing.
[b]Corrected for extractables.
[c]Polysufone-vinyl reactive, thermally cured at 275° C.
[d]Cured at 200° C.
[e]Also contained 14.5 percent of a cross-linking booster.
[f]Polysulfone P-1700 (union carbide)

EXAMPLE 19

The solution copolymerization of a polysulfone-vinyl reactive resin (acryloxy ethoxy end-groups, 0.23 initial R. V.) with styrene in mono-chlorobenzene was carried out to partial competition to minimize the tendency of premature crosslinking. Nevertheless, when the weight percent of PSF-VR in the feed exceeded 30 percent, complete gelation usually resulted. Between 12.5 and 30 percent polysulfone-vinyl reactive loadings in the feed provided partially gelled products. Soluble copolymers were also prepared at polysulfone-vinyl reactive charges below 12.5 percent. The characteristics of some of the soluble copolymers are shown in Table XV below. Compositions of these copolymers were determined by elemental analysis. In every instance the polysulfone-vinyl reactive was found to be richer in the copolymer than in the feed. They are soluble in methyl ethyl ketone or toluene, which are non-solvents for the polysulfone-vinyl reactive homopolymers. The molecular weights of the products increased rapidly with increasing polysulfone-vinyl reactive/styrene charge ratios. These thermoplastic resins can be compression-molded to clear or slightly hazy plaques; they are usually brittle and resemble polystyrene.

Any advantage of raising the glass transition temperature of polystyrene by copolymerizing with polysulfone-vinyl reactive was found to be minor. Preliminary DSC data showed that the glass transition temperature of the copolymers increased only slightly from that of polystyrene (Tg 100° C.) at these levels of polysulfone-vinyl reactive contents; substantial increases were achieved only at high loadings of polysulfone-vinyl reactive component.

TABLE XV

SOLUTION COPOLYMERIZATION OF PSF-VR[a] WITH STYRENE

| | | | | | |
|---|---|---|---|---|---|
| PSF-VR[a]/styrene Wt. ratio in feed | 0/100 | 5/95 | 7.5/92.5 | 10/90 | 12.5/87.5 |
| PSF-VR[a]/polystyrene[b] Wt. ratio in copolymer | 0/10 | 9.27/90.73 | 16.4/83.6 | 14.9/85.1 | 24.7/75.3 |
| R.V., dl/gm[c] | 0.51 | 0.58 | 0.61 | 0.70 | 1.06 |
| Conversion, percent | 48 | 49 | 48 | 55 | 50 |

Notes:
[a]Polysulfone-vinyl reactive, acryloxy ethoxy end-groups, 0.23 R.V.
[b]Copolymer composition determined by elemental analysis.
[c]Measured in chloroform at 25° C.

EXAMPLE 20

Several glass mat reinforced polysulfone-vinyl reactive laminates were prepared.

(The hydroxy terminated polysulfones which were vinyl end-capped were prepared from bisphenol A and 4,4'-dichlorodiphenyl sulfone as described in Example 1.) The mechanical properties of two of the glass mat reinforced polysulfone-vinyl reactive laminates were compared to those of a laminate formulated with a commercial corrosion-resistant polyester resin (ICI Atlac 382—05A)—the results are given in Table XVI below. In addition to their good mechanical strength, the finished laminates also exhibited a high gloss and smooth surface comparable to the commercial material. A very high heat deflection temperature was obtained with the laminate made from the vinyl benzyloxy end-capped, 0.17 R. V. polysulfone-vinyl reactive resin (which may be the result of a higher cross-linking density attained with this particular resin).

The electrical properties of one of the glass mat reinforced polysulfone-vinyl reactive laminate are listed in Table XVII below together with those of a laminate made with a commercial polyester resin (Freeman Stypol-2995). Performance of both matrix resins are rated excellent.

TABLE XVI

MECHANICAL PROPERTIES OF GLASS MAT[a] REINFORCED LAMINATES

| Matrix Resin[b] | PSF-VR[c] (Vinyl benzyloxy 0.17) | PSF-VR[c] (Methacryloxy ethoxy 0.21) | Atlac 382-05A |
|---|---|---|---|
| Percent Glass (plies) | 29 | 30 | 28 |
| Sp. gr. | 1.82 | 1.85 | 1.81 |
| Tensile Strength, psi | 14,300 | 14,400 | 11,900 |
| Tensile Modulus, $\times 10^{-6}$ psi | 1.01 | 0.89 | 0.83 |
| Elongation, percent | 1.69 | 1.79 | 1.81 |
| Flexural Strength psi | 24,700 | 28,700 | 27,600 |
| Flexural Modulus, $\times 10^{-6}$ psi | 1.48 | 1.38 | 1.55 |
| Izod Impact Strength ft-lb/in. of notch | 13.5 | 15.0 | 13.9 |
| Compressive Strength, psi | 15,900 | 14,000 | 14,100 |
| Compressive Modulus, $10^{-6}$ psi $\times$ | 1.98 | 1.96 | 1.60 |
| HDT @ 264 psi, °C. | 276°-305° | 258° (6 mil. def.) | 258° (2 mil. def.) |

Notes:
[a]Vitro-Flex 630D, 1 inch chopped strand mat.
[b]Dissolved in styrene monomer.
[c]Polysulfone-vinyl reactive.

TABLE XVII

ELECTRICAL PROPERTIES OF GLASS MAT[a] REINFORCED LAMINATES

| Matrix Resin[b] | PSF-VR[c] Methacryloxy Ethoxy (end groups, 0.20 R.V.) | Freeman Stypol 2995 |
|---|---|---|
| Percent Glass (plies) | 28 (4) | 28 (4) |
| Dielectric Strength, volts/mil | 359 | 194 |
| Volume Resistivity, Ohm-cm $\times 10^{-16}$ | 0.6 | 1.1 |
| Dissipation Factor, 60 cycles | 0.00325 | 0.00599 |
| $10^3$ cycles | 0.00283 | 0.00579 |

TABLE XVII-continued

| Matrix Resin[b] | PSF-VR[c] Methacryloxy Ethoxy (end groups, 0.20 R.V.) | Freeman Stypol 2995 |
|---|---|---|
| Dielectric Constant, 60 cycles | 4.90 | 5.63 |
| $10^3$ cycles | 4.88 | 5.56 |
| Arc Resistance, sec. | 167 | 182 |

ELECTRICAL PROPERTIES OF GLASS MAT[a] REINFORCED LAMINATES

Notes:
[a]Vitro-Flex 630D, 1 inch chopped strand mat.
[b]Dissolved in styrene monomer.
[c]Polysulfone-vinyl reactive.

Examples 21 and 22 involve the cross-linking of the polysulfone-vinyl reactive resins.

EXAMPLE 21

A methacryloxy ethoxy end-capped polysulfone-vinyl reactive resin having a reduced viscosity (R.V.) of 0.22 dl/g (measured in chloroform at 25° C.) and a number average molecular weight of 11,590 was treated thermally in the presence of dicumyl peroxide to produce a higher molecular weight polymer of a cured polymer composition. (The hydroxy terminated polysulfones which were vinyl end-capped were prepared from bisphenol A and 4,4'-dichlorodiphenyl sulfone as described in Example 1.) Table XVIII sets out the data.

TABLE XVIII

| Method | T °C. | $t_{min}$ | Dicumyl Proxide[a] % of wt. | Results |
|---|---|---|---|---|
| Compression molding | 190° | 30 | 2 | R.V. advanced to 0.65 dl/g |
| Compression molding | 220° | 10 | 2 | Cross-linked no longer soluble in $CHCl_3$ |
| Compression molding | 190° | 30 | 2% plus 1% TAC[b] | Cross-linked, no longer soluble in $CHCl_3$ |
| Compression molding | (i)190° (ii)220° | (i)30 (ii)12 | 2% plus 1% TAC | Highly cross-lined no longer soluble in $CHCL_3$ |

Notes:
[a]Incorporated by imbibing from hexane solution and followed by vacuum drying to remove the hexane.
[b]Triallylcyanurate, a crosslinking booster.

EXAMPLE 22

A vinyl benzyloxy end-capped polysulfone-vinyl reactive resin having a R. V. of 0.37 dl/g (measured in chloroform at 25° C. was compression molded at elevated temperatures in the presence of a radical initiator to produce a cross-linked polyarylether composition. (The hydroxy terminated polysulfones which were vinyl end-capped were prepared from bisphenol A and 4,4'-dichlorodiphenyl sulfone as described in Example 1.) Table XIX sets out the data.

TABLE XIX

| Initiator Type | Initiator Loading % by wt | Molding T °C. | Molding t min | Results |
|---|---|---|---|---|
| Dicumyl peroxide | 1 | 220° | 10 | crosslinked, no longer soluble in $CHCl_3$ |
| Dicumyl peroxide TAC[a] | 1 1 | 220° | 10 | crosslinked, improved stress-cracking resistance to acetone |
| Vinyltris (t-butyl-peroxy) silane | 1 | 220° | 10 | crosslinked, good adhesion to aluminum substrate |
| 2,5-Dimethyl-2,5-bis (t-butylperoxy)hexyne-3 | 1 | 220° | 10 | crosslinked, improved stress-cracking resistance. |

Notes:
[a]Triallyl cyanurate

EXAMPLE 23

Into a 500 ml 3-necked flask, fitted with a water trap, mechanical stirrer, condenser, thermometer and an argon inlet, there was placed 20 gm (0.0036 mole) of a hydroxy-terminated sulfone oligomer (molecular weight =5,580) and 100 ml of dimethyl sulfoxide. (The hydroxy terminated polysulfone was prepared from bisphenol A and 4,4 'dichlorodiphenyl sulfone as described in Example 1.) The mixture was heated to 90° C. to give a homogeneous solution. Thereafter, 1 ml of a NaOH solution (28.8 percent, equivalent to 0.0072 mole) was introduced together with 25 ml of benzene. Azeotropic distillation began at about 115° C. and was allowed to continue until no more water was forming. A total of 2 ml water was collected. The reaction vessel temperature was raised to 135° C. and a solution of 3.8 g of allyl chloride (0.05 mole) in 5 ml of dimethyl sulfoxide was added. The reaction medium turned to a light amber color and the solution was kept at a temperature between 125° to 130° C. for a period of 45 minutes. Upon cooling to room temperature, the salt was removed by filtration. The filtrate was poured into a large excess of isopropanol and a white fluffy solid was recovered. The conversion was better than 98 percent (19.7 g). It showed a reduced viscosity of 0.18 dl/g in chloroform at 25° C. Infrared spectrum of a film cast from $CHCl_3$ indicated that the resulting sulfone oligomers no longer possessed hydroxy end-groups. The product was an alloxy (allyloxy) end-capped polysulfone-vinyl reactive resin (oligomer).

EXAMPLE 24

Using the same apparatus as described in Example 23 but employing the following starting materials and reagents.

| | |
|---|---|
| Hydroxy terminated polysulfone (molecular wt. 39,000) | 39 gm (0.001 mole) |
| KOH (in the form of a 11.2% solution) | 0.112 gm (0.002 mole) |
| Dimethyl Sulfoxide | 200 ml |
| Benzene | 80 ml |
| Allyl Chloride | 1.147 gm (0.015 mole) |

(The hydroxy terminated polysulfone was prepared from bisphenol A and 4,4'-dichlorodiphenyl sulfone as described in Example 1.) The end-capping reaction and product isolation were carried out following the procedures used in Example 23. 38 g of a white fluffy polysulfone-vinyl reactive polymer was recovered. It showed a reduced viscosity of 0.58 dl/gm in chloroform at 25° C.

EXAMPLE 25

Ten grams of the alloxy end-capped polysulfone resin prepared in Example 23 was placed between two sheets of aluminum foil and the assembly was pressed at 240° C. for a period of 15 minutes. T-peel test showed the peel strength between the aluminum foil and polysulfone to be between 4 to 8 lbs./in.

EXAMPLE 26

A solution of 0.1 gm of each of 2,5-dimethyl-2,5-bis-(trimethylsilylperoxy)-hexane and triallylcyanaurate in hexane was intimately blended with 5 gm of the alloxy end-capped sulfone oligomer prepared in Example 23. Upon being intimately blended, the hexane was removed under vacuum at 50° C. The dried blend was molded with an electrically-heated hydraulic press at 240 ° C. for a 15 minute cycle. The resulting plaque was partially soluble in chloroform, and the presence of cross-linked gels was visible.

EXAMPLE 27

An aluminum-polysulfone-aluminum joint was prepared with the alloxy terminated polysulfone resin prepared in Example 23 and aluminum Q-panels. The polysulfone-vinyl reactive resin adhesive layer was cured by adding 2 percent of each of 2,5-dimethyl-2,5-bis-(trimethyl-silylperoxy) hexane and triallylcyanurate in a manner as described in Example 26. The finished joint was measured for T-peel strength with an Instron machine at a cross-head speed of 2 inches per minute. The value was 5 to 6 lbs./in. Under similar conditions, joints made of standard polysulfone showed less than 2 lbs./in. peel strength.

EXAMPLE 28

Alloxy terminated polysulfone resin prepared from Example 23 was molded at 210° C. to a 25 mil thick plaque. A set of lap-shear joints was subsequently made with the above plaque and titanium bars (1"×4"×55 mil). A peroxide initiator, vinyl tris-(t-butylperoxy) silane, was used to prime the surface of both the polysulfone-vinyl reactive resin layer and the titanium substrates. Curing was effected at 230° C. for a ten minute cycle. Lap-shear strength of the above joints was measured to be 880 psi.

EXAMPLE 29

Into a 2 liter, four-necked flask, equipped with a mechanical stirrer, water trap, addition funnel, thermometer and argon inlet, there was placed 174.62 grams (0.8 mole) of 4,4'-thiodiphenol, 500 milliliters of DMSO, and 700 milliliters of monochlorobenzene. Upon dissolution at 75° C., a caustic solution containing 64.96 grams (98.5 percent purity) of NaOH and 75 milliliters of distilled water was introduced. Azeotropic distillation was carried out until no more water was produced. A hot, dry monochlorobenzene solution containing 215.95 grams (0.753 mole) of 4,4'-dichlorodiphenyl sulfone was introduced. The polymerization reaction was maintained at 165° C. for 90 minutes. Thereafter, the sodium phenolate end-group concentration was determined by titration. The polymer had the following structural formula:

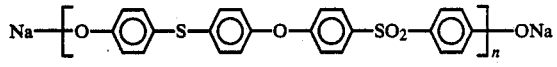

The polymer was end-capped with allyl groups via the sodium phenolate end groups following the procedure of Example 1 using allyl chloride.

EXAMPLE 30

Into a 2 liter, four-necked flask, equipped with a mechanical stirrer, water trap, addition funnel, thermometer, and argon inlet, there was placed 74.49 grams (0.4 mole) of p,p'-biphenol, 350 milliliters of monochlorobenzene and 275 milliliters of DMSO. Upon dissolution at 70° C., a caustic solution containing 32.48 grams of NaOH (98.5 percent purity) and 37.5 milliliters of distilled water was added. Azeotropic distillation was carried out until the reaction medium temperature reached 155° C., when a total of 382.5 grams of distillate had been collected. The temperature was lowered to 140° C. and a hot solution of 109.05 grams (0.38 mole) of sulfone monomer in 125 milliliters of dry monochlorobenzene was rapidly introduced. Thereafter, the reaction temperature was raised to 165° C. by distilling off 162.2 grams of monochlorobenzene and maintained at this temperature overnight. The sodium phenolate end-groups were determined by titration. The polymer had the following structural formula:

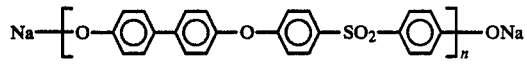

The polymer was end-capped with vinyl benzyl groups via the sodium phenolate end groups following the procedure of Example 2 using vinyl benzyl chloride.

EXAMPLE 31

Into a 1-liter, four-necked flask, equipped with a mechanical stirrer, water trap, addition funnel, thermometer and argon inlet, there was placed 101.12 grams (0.4 mole) of 4,4'-sulfonyl-diphenol, 510 milliliters of monochlorobenzene and 250 milliliters of DMSO. Upon dissolution at 75° C., a caustic solution containing 16.24 grams (98.5 percent purity, 0.8 mole) of sodium hydroxide and 37.5 milliliters of distilled water was introduced. Azeotropic distillation was carried out until the temperature of the reaction medium reached 155° C. when a total of 290.4 grams of distillate was collected. The reaction temperature was lowered to 140° C. and a hot solution of 97.55 grams (0.34 mole) of sulfone monomer in 12 milliliters of dry monochlorobenzene was added. An additional 441.8 grams of solvent was distilled off to raise the reaction temperature to 165° C. It was kept at this temperature for 3 hours. The polymer had the following structural formula:

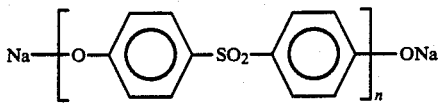

The polymer was end-capped with vinyl benzyl groups via the sodium phenolate end groups following the procedure of Example 2 using vinyl benzyl chloride.

EXAMPLE 32

Into a 500 cc four-neck flask fitted with stirrer, thermometer, dropping funnel, and Y tube with $N_2$ inlet tube and helices-packed fractionating column with water trap and condenser, were placed 22.83 grams of Bisphenol-A (0.1 mole), 45 milliliters of DMSO and 55 milliliters of toluene. Air was displaced by nitrogen and 16.02 grams of 49.94 percent NaOH (0.2 mole) was added. The mixture was refluxed, removing water until no more was evident; then toluene was distilled off to a pot temperature of 160° C. The polymer was end-capped with allyl groups via the sodium phenolate end groups following the procedure of Example 1 using allyl chloride.

EXAMPLE 33

The same apparatus and procedure as in Example 32 was used with 25.03 grams of 4,4'-dihydroxydiphenyl sulfone (0.1 mole), 60 milliliters of DMSO, 85 milliliters of toluene and 16.04 grams of 49.90 per cent NaOH (0.2 mole). The bisphenol disodium salt was dehydrated as before and most of the toluene was distilled. The mixture was cooled. The polymer derived from bisphenol S was end-capped with allyl groups via the sodium phenolate end groups following the procedure of Example 1 using allyl chloride.

EXAMPLE 34

Into an apparatus similar to that described in Example 32 were placed 25.03 grams of 4,4'-dihydroxydiphenyl sulfone (0.1 mole), 70 milliliters of DMSO and 100 milliliters of toluene. Air was displaced by $N_2$ and 16.03 grams of 49.90 percent NaOH (0.2 mole) was added. The mixture was refluxed, removing water until no more was evident, and then toluene was distilled off to a pot temperature of 160° C. A solution of 24.15 grams of 4,4'-difluorodiphenyl sulfone (0.095 mole) and 33 milliliters of dry chlorobenzene were added. The mixture was heated with stirring at 160° to 170° C. for 2½ hours to complete the oligomerization and then cooled to 130° C. The polymer (Bisphenol S polyether) was end-capped with vinyl benzyl groups via the sodium phenolate end groups following the procedure of Example 2 using vinyl benzyl chloride.

EXAMPLE 35

Into an apparatus like that described in Example 32 were placed 22.83 grams of Bisphenol A (0.1 mole), 70 milliliters of DMSO and 80 milliliters of toluene. Air was displaced by nitrogen and 15 85 grams of 50.48 percent NaOH (0.2 mole) was added. The mixture was refluxed, removing water until no more was evident, and then toluene was distilled off to a pot temperature of 150° C. A solution of 20.51 grams of 4,4'-difluorobenzophenone (0.095 mole) in 20 milliliters of dry chlorobenzene was gradually added. On adding the last increment of the difluorobenzophenone, the polymer viscosity became very high, but on continued heating at about 160° C. for 1½ hours it decreased somewhat. The mixture was diluted with dry monochlorobenzene and cooled to about 140° C. The polymer (Bisphenol—difluorobenzophenone polyether) was end-capped with vinyl benzyl groups via the sodium phenolate end groups following the procedure of Example 2 using vinyl benzyl chloride.

EXAMPLE 36

Into a 250 ml. flask equipped with a stirrer, thermometer, a water cooled condenser and a Dean Stark moisture trap filled with benzene, there were placed 11.42 grams of 2,2-bis-(4-hydroxyphenyl)propane (0.05 moles), 13.1 grams of 42.8 percent potassium hydroxide solution (0.1 moles KOH), 50 ml. of dimethylsulfoxide and 6 ml. benzene and the system purged with nitrogen to maintain an inert atmosphere over the reaction mixture. The mixture was refluxed for 3 to 4 hours, continuously removing the water contained in the reaction mixture as an azeotrope with benzene and distilling off enough of the latter to give a refluxing mixture at 130° to 135° C., consisting of the dipotassium salt of the 2,2-bis(4-hydroxyphenyl)propane and dimethylsulfoxide essentially free of water. The mixture was cooled and 14.35 grams (0.05 mole) of 4,4'-dichlorodiphenylsulfone was added followed by 40 ml. of anhydrous dimethylsulfoxide, all under nitrogen pressure. The mixture was heated to 130° C. and held at 130° to 140° C. with good stirring for 4 to 5 hours. The viscous, orange solution was poured into 300 ml. water, and rapidly circulating in a Waring Blender. The resultant finely divided white polymer was filtered and then dried in a vacuum oven at 110° C. for 16 hours. The yield was 22.2 g (100 percent) and the reaction was 99 percent complete based on a titration for residual base. The polymer had the following structural formula:

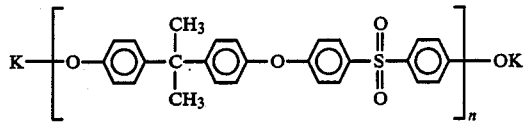

The polymer was end-capped with allyl groups via the potassium phenolate end groups following the procedure of Example 1 using allyl chloride.

EXAMPLE 37

This example was conducted using the procedure of Example 36, except 1,1-bis-(4-hydroxyphenyl)-1-phenylethane (bisphenol of acetophenone) was used as the dihydric phenol. The reaction time was 10 hours at 130° to 140° C. and the reduced viscosity in chloroform was 0.54. At the conclusion of the reaction, a solution of 0.5 g methyl chloride in 6 ml of dimethylsulfoxide was added at 90° to 100° C. to convert unreacted aryloxide end-groups to the more stable aryl methyl ether end-groups. The polymer had the following structural formula:

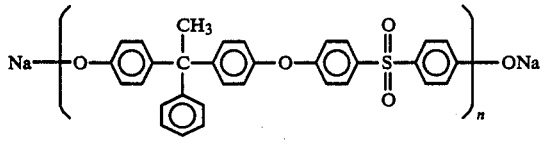

The polymer was end-capped with vinyl benzyl groups via the sodium phenolate end groups following the procedure of Example 2 using vinyl benzyl chloride.

EXAMPLE 38

This example was conducted using the procedure of Example 36, except that the dihydric phenol employed was 4,4'-dihydroxydiphenylmethane and the reaction temperature and time were 130° to 135° C. and 7 hours, respectively. The polymer had the following structural formula:

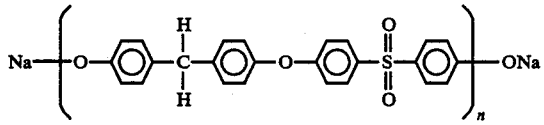

The polymer was end-capped with vinyl benzyl groups via the sodium phenolate end groups following the procedure of Example 1 using vinyl benzyl chloride.

EXAMPLE 39

This example was conducted using the procedure of Example 36, except hydroquinone was used as the dihydric phenol and reaction conducted at 130° to 140° C. for 6 hours. The polymer had the following structural formula:

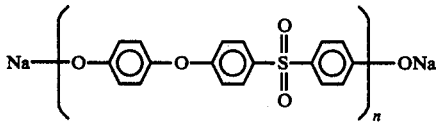

The polymer was end-capped with allyl groups via the sodium phenolate end groups following the procedure of Example 1 using allyl chloride.

EXAMPLE 40

This example was conducted using the procedure of Example 36, except that 1,3-bis(p-hydroxyphenyl)-1-ethylcyclohexane (the bisphenol prepared by acid catalyzed condensation of 2 moles of phenol with one mole vinylcyclohexene) was used as the dihydric phenol. The reaction was conducted for 7 hours at 130° to 140° C. The polymer had the following structural formula:

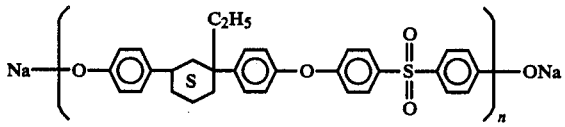

The polymer was end-capped with allyl groups via the sodium phenolate end groups following the procedure of Example 1 using allyl chloride.

EXAMPLE 41

This example was conducted using the procedure of Example 36, except that the dihydric phenol was 1,1-bis(4-hydroxyphenyl)-2,2-dimethylethane (i.e., the bisphenol of isobutyraldehyde). The reaction was conducted for 7 hours at 130° to 135° C. The polymer had the following structural formula:

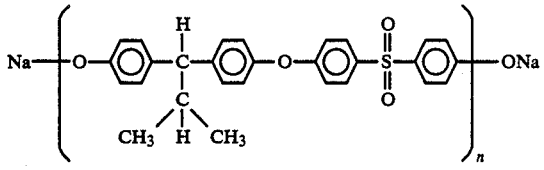

The polymer was end-capped with allyl groups via the sodium phenolate end groups following the procedure of Example 1 using allyl chloride.

EXAMPLE 42

This example was conducted using the procedure of Example 36, except that the dihydric phenol was 4,4'-dihydroxybenzophenone. The reaction was conducted for 4½ hours at 135° to 145° C. The polymer had the following structural formula:

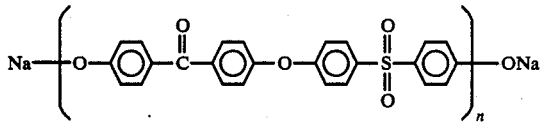

The polymer was end-capped with allyl groups via the sodium phenolate end groups following the procedure of Example 1 using allyl chloride.

EXAMPLE 43

This example was conducted using the procedure of Example 36, except the dihydric phenol was 4,4'-(dihydroxyphenyl) diphenylmethane (bisphenol of benzophenone). The reaction was conducted for 20 minutes at 110°–127° C. The polymer had the following structural formula:

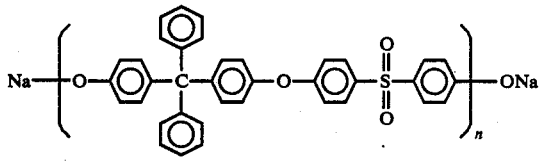

The polymer was end-capped with vinyl benzyl groups via the sodium phenolate end groups following the procedure of Example 2 using vinyl benzyl chloride.

EXAMPLE 44

To a solution of 24.26 g of 4,4'-dihydroxy diphenyl ether (0.12 mole) in 160 cc. of dimethyl sulfoxide and 45 cc. benzene in a 500 cc. reaction flask was added under a nitrogen atmosphere 25.27 g of 53.28 percent KOH (0.24 mole). The mixture was refluxed with stirring and slow nitrogen sparge with removal of water by a Dean-Stark trap for a total of 5 hrs. The mixture of solid potassium salt of 4,4'-dihydroxydiphenyl ether and solvent was cooled to room temperature and 34.46 g of 4,4'-dichlorodiphenylsulfone (0.12 mole) added. The reaction mixture was then warmed to about 130° C. for 3.5 hours during which time it became quite viscous. The mixture was cooled to 110° to 120° C. and methyl chloride bubbled in for a short time to methylate any unreacted phenoxide groups. The polymer had the following structural formula:

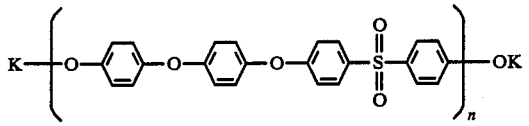

The polymer was end-capped with allyl groups via the potassium phenolate end groups following the procedure of Example 1 using allyl chloride.

EXAMPLE 45

To a solution of 27.4 g of 2,2-bis(4-hydroxyphenyl)-propane (0.12 mole), 160 cc. of dimethylsulfoxide and 45 cc. of benzene there was added 25.27 grams of a 53.28 percent aqueous KOH solution 0.24 mole). The mixture was refluxed as in Example 44 for 5 hours for water removal and securing the anhydrous dipotassium salt of the 2,2-bis(4-hydroxyphenyl) propane dissolved in the dimethylsulfoxide. The mixture was cooled and 23.04 g of 2,4-dichloronitrobenzene (0.12 mole) was added. Some darkening and a rapid temperature rise to 70° C. were noted. After about 10 min. at this temperature, the viscosity was noticeably increased. The mixture was held for 3½ hours at about 80° C. and then methyl chloride bubbled in for a short time. The reaction mixture was diluted with 40 cc. benzene and filtered through a Seitz filter to remove salt. The polymer had the following structural formula:

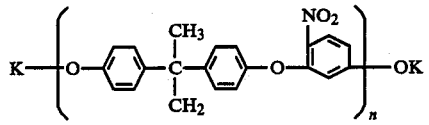

The polymer was end-capped with vinyl benzyl groups via the potassium phenolate end groups following the procedure of Example 5 using vinyl benzyl chloride.

EXAMPLE 46

This example was conducted using essentially the procedure of Example 29, employing as one reactant, the dipotassium salt of hexafluorobisphenol-A having the structural formula:

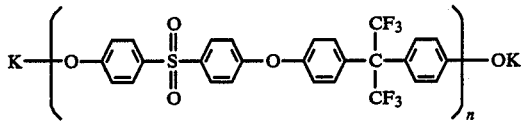

The polymer was end-capped with vinyl benzyl groups via the potrassium phenolate end groups following the procedure of Example 2 using vinyl benzyl chloride.

EXAMPLE 47

This example was conducted using substantially the procedure of Example 46, except that 4,4'-difluorobenzophenone was substituted for the 4,4'-difluorodiphenylsulfone. The polymer had the following structural formula:

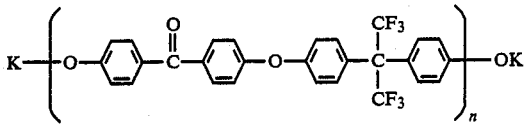

The polymer was end-capped with vinyl benzyl groups via the potassium phenolate end groups following the procedure of Example 2 using vinyl benzyl chloride.

EXAMPLE 48

Into an air-free 500 ml flask equipped with a stirrer, gas inlet tube, thermocouple, distillation trap and reflux condenser was placed 65 grams of dimethylsulfoxide and 200 grams of chlorobenzene azeotrope former. The ratio of dimethylsulfoxide to chlorobenzene was 1:3.1. 39.1 grams (0.1314 mole) of 1,3-bis-(p-hydroxyphenyl)-1-ethylcyclohexane (the bisphenol prepared by an acid catalyzed condensation of 2 moles of phenol with one mole vinylcyclohexene) and 37.7 grams (0.1314 mole) of 4,4'-dichlorodiphenylsulfone were then simultaneously charged into the reaction flask which was immediately sparged with nitrogen to exclude any possibility of air contamination. Thereafter, the solution was heated to about 75° C. and 21.5 grams (0.2628 mole) of 49 percent aqueous sodium hydroxide were added from a dropping funnel. Two liquid phases formed immediately. The reaction mass was then heated to 120° C. at which point a water-chlorobenzene azeotrope began distilling from the system. Distillation of the azeotrope was continued for about 30 minutes with a gradual rise in temperature to 140° C. at which point essentially all of the water in the system was removed. The disodium salt of the 1,3-bis-(p-hydroxyphenyl)-1-ethylcyclohexane precipitated and one liquid phase was present. Excess chlorobenzene was then removed by increasing the temperature gradually to about 170° C. and distilling off excess azeotrope former for about 20 minutes. At this point the ratio of dimethylsulfoxide to chlorobenzene was 4:1. As soon as this ratio was reached, considerable polymerization occurred because of the high reaction temperature. The temperature of the reaction mass was rapidly dropped to about 150° to 160° C. and held there with stirring for about one hour. Gaseous methyl chloride was introduced until no more was absorbed. The mixture was diluted to 10 to 15 percent solids by adding chlorobenzene. The polymer ha the structural formula:

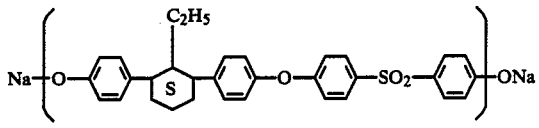

The polymer was end-capped with vinyl benzyl groups via the sodium phenolate end groups following the procedure of Example 2 using vinyl benzyl chloride.

EXAMPLE 49

Example 48 was repeated except that in place of 4,4'-dichlorodiphenylsulfone, 32.0 g (0.1314 mole) of 4,4'-dichloroazobenzene was used. The polymer had the following structural formula:

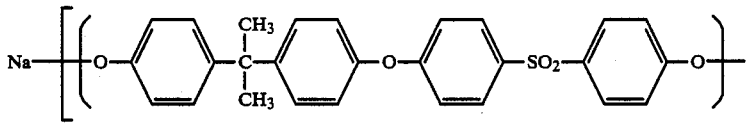

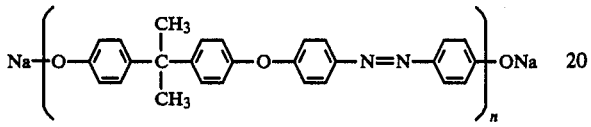

The polymer was end-capped with allyl groups via the sodium phenolate end groups following the procedure of Example 1 using allyl chloride.

EXAMPLE 50

Example 48 was repeated except that in place of the 1,3-bis-(p-hydroxyphenyl)-1-ethylcyclohexane, 25.5 g (0.05 mole) of tetramethylene dibisphenol-A (the bisphenol prepared by condensation of 2 moles of phenol with 1,4-bis(p-isopropenyl phenyl) butane and the corresponding molecular quantities of the 4,4'-dichlorodiphenyl sulfone (14 4 g, 0.05 mole) and caustic (8.1 g of 12.46 me/g., 0.10 mole) were used. The polymer had the following structure:

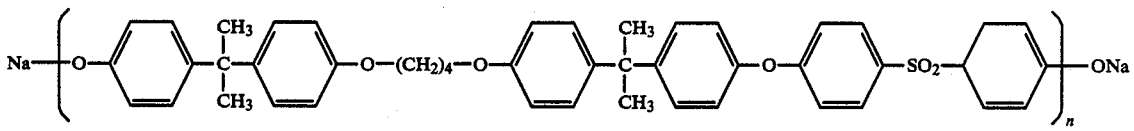

The polymer was end-capped with allyl groups via the sodium phenolate end groups following the procedure of Example 1 using allyl chloride.

EXAMPLE 51

Example 48 was repeated except that instead of the 1,3-bis-(p-hydroxyphenyl)-1-ethylcyclohexane, 22.5 g (0.0985 mole) of bisphenol A was used in addition to 16.8 g (0.0329 mole of tetramethylene dibisphenol A. The polymer had the structural formula:

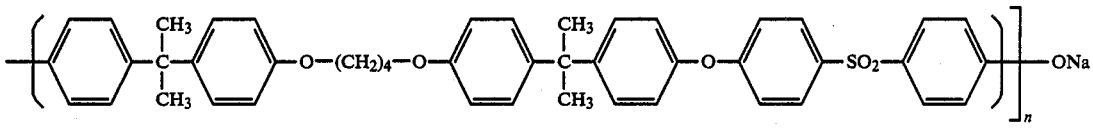

The polymer was end-capped with vinyl benzyl groups via the sodium phenolate end groups following the procedure of Example 2 using vinyl benzyl chloride.

EXAMPLE 52

Example 48 was repeated except that instead of the 1,3-bis-(p-hydroxyphenyl)-1-ethylcyclohexane, 22.5 g (0.0985 mole) of bisphenol A was used in addition to 6.7 g (0.033 mole) of 4,4'-dihydroxydiphenyl ether. The polymer had the structural formula:

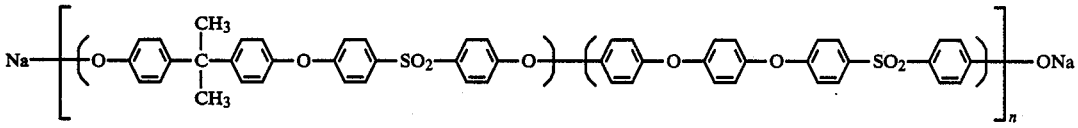

The polymer was end-capped with vinyl benzyl groups via the sodium phenolate end groups following the procedure of Example 2 using vinyl benzyl chloride.

EXAMPLE 53

Example 48 was repeated except that in place of 4,4'-dichlorodiphenylsolfone, 61.17 g of 1,4-bis(p-chloro-N-methyl-benzene sulfonamido)butane, having the structural formula:

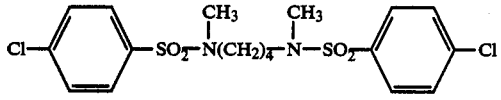

(melting point 179.5°-180.5° C.) and prepared by the reaction of potassium p-chloro-N-methyl-benzenesulfonamide with 1,4-dichlorobutane, was used. The reaction time was 2 hours at about 160° C. The polymer had the structural formula:

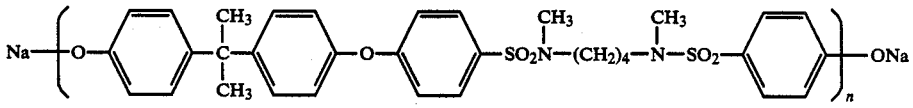

The polymer was end-capped with allyl groups via the sodium phenolate end groups following the procedure of Example 1 using allyl chloride.

EXAMPLE 54

Example 48 was repeated except that in place of 4,4'-dichlorodiphenylsulfone, 57.2 g of piperazine bis-p-chlorobenzenesulfonamide having the structural formula:

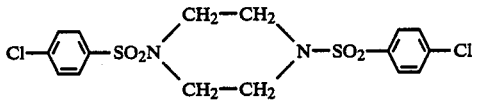

(melting point 324° to 325° C.) and prepared by reacting p-chloro-benzenesulfonyl) chloride with piperazine, was used. The polymerization time was 1 hour at 160° to 170° C. The polymer crystallized out on cooling the reaction mixture. The polymer had the structural formula:

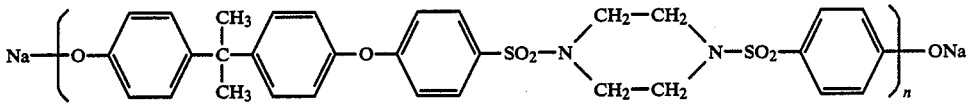

The polymer was end-capped with allyl groups via the sodium phenolate end groups following the procedure of Example 1 using allyl chloride.

EXAMPLE 55

A 50/50 blend of the polysulfone-vinyl reactive resin of Example 1 and a commercial polysulfone was extruded with a 1-foot single-screw extruder operating at a temperature between 260° to 310° C., and was pelletized to give a uniform composition. The pellets were injection molded using a Van Dorne Injection Machine at 358° C. The barrel residence time was about 3 minutes, and the mold temperature was maintained at 115° C. The injection-molded parts were post-cured using either an air oven or an acid (or base) bath. For instance, a $2\frac{1}{2}''\times\frac{1}{2}''\times\frac{1}{8}''$ specimen was heated in an air oven at 275° C. for a period of 35 minutes.

EXAMPLE 56

The polysulfone-vinyl reactive resin (of Example 3) was compression molded at 220° C. (200 psi, 30 min.) to form a 20 mil thick plaque. The latter was laminated with a 4"×1"×1/16" titanium panel at an initial temperature of 220° C. and a finish temperature of 270° C. The total heating time lasted for 55 min., and only contact pressure was used.

What is claimed is:

1. A thermosetting, end-capped, polyarylene polyether having the formula:

Z—O—(polyarylene polyether)—O—Z' wherein Z and Z' are each polymerizable, ethylenically-unsaturated radicals selected from the group consisting of allyl, vinyl, vinylbenzyl, vinyloxyethylene, acrylate, oxyethylene acrylate, oxyethylene methacrylate and methacrylate radicals.

2. The end-capped polyarylene polyether of claim 1 wherein said —(polyarylene polyether)—structural unit comprises:

—E—(OE'—O—E)n— wherein n is a positive integer, E is the residuum of a dihydric phenol and E' is the residuum of an aromatic compound having two halo substituents.

3. The end-capped polyarylene polyether as claimed in claim 2 wherein n is 2 to 300.

4. The end-capped polyarylene polyether of claim 2 wherein E is selected from the group consisting of

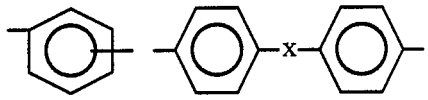

and mixtures thereof wherein x is selected from the group —CO—, —$SO_2$—, —CR,R'— a direct bond, —O—, —S— and $C_1$-$C_6$ alkyl, R and R' are independently H— or $C_1$-$C_6$ alkyl; and E' comprises at least one member of the group

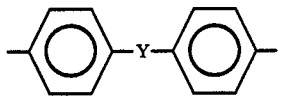

wherein Y is —$SO_2$—, —CO—, or $C_1$-$C_4$ perfluoroalkyl.

5. The end-capped polyarylene polyether of claim 2 wherein E is selected from the group consisting of

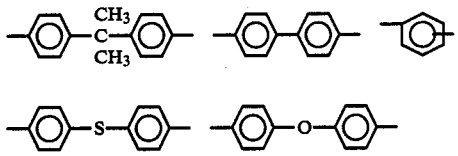

and mixtures thereof and E' is selected from the group consisting of

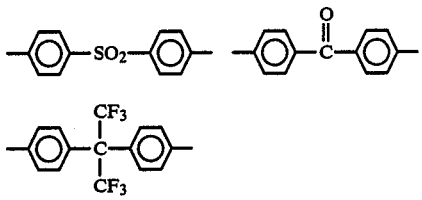

and mixtures thereof.

6. The end-capped polyarylene polyether of claim 1 wherein Z and Z' are vinyl benzyl groups.

7. The end-capped polyarylene polyether of claim 1 wherein Z and Z' are allyl groups.

8. A thermosetting, end-capped polyarylene polyether having the formula

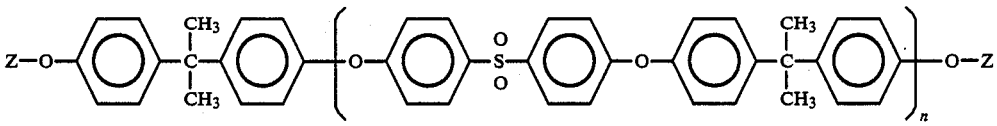

wherein n is from 2 to 200, and Z is selected from the group allyl, vinyl, vinyloxyethylene, vinyl benzyl, oxyethylene acrylate, oxyethylene methacrylate, acrylate and methacrylate.

9. A polymerizable mixture comprising at least one polymerizable, ethylenically-unsaturated monomer and the thermosetting, end-capped polyarylene ether of claim 1.

10. The mixture of claim 9 wherein the ethylenically-unsaturated monomer is selected from the group consisting of acrylate monomers, methacrylate monomers, vinyl aromatic monomers, acrylonitrile monomers, allyl monomers, conjugated diene monomers, and mixtures thereof.

* * * * *